United States Patent [19]

Douglas et al.

[11] 4,298,581
[45] Nov. 3, 1981

[54] PROCESS FOR RECOVERING CHROMIUM, VANADIUM, MOLYBDENUM AND TUNGSTEN VALUES FROM A FEED MATERIAL

[75] Inventors: Donald A. Douglas, Amherst, N.H.; Jameel Menashi, Lexington; Alkis S. Rappas, Bedford, both of Mass.

[73] Assignee: Cabot Corporation, Kokomo, Ind.

[21] Appl. No.: 140,437

[22] Filed: Apr. 15, 1980

[51] Int. Cl.$^3$ .................. C01G 31/00; C01G 37/00; C01G 39/00; C01G 41/00

[52] U.S. Cl. ............................ 423/58; 423/61; 423/65; 423/68; 423/55; 423/23; 423/27; 423/138; 423/150; 423/53

[58] Field of Search ............... 423/55, 58, 61, 65, 423/68, 23, 27, 138, 150; 75/97 R, 101 R

[56] References Cited

U.S. PATENT DOCUMENTS

| | | | |
|---|---|---|---|
| 2,394,362 | 2/1946 | Burwell | 423/58 |
| 2,816,015 | 12/1957 | Donaldson | 423/58 |
| 2,839,359 | 6/1958 | Dunning | 423/58 |
| 2,967,650 | 12/1960 | Hixson et al. | 423/58 |
| 3,969,478 | 7/1976 | Zekikman et al. | |
| 4,066,734 | 1/1978 | Bockelmann et al. | |
| 4,145,397 | 3/1979 | Toida et al. | |
| 4,207,295 | 6/1980 | Kagetsu et al. | 423/61 |

*Primary Examiner*—Herbert T. Carter
*Attorney, Agent, or Firm*—Jack Schuman; Robert F. Dropkin

[57] ABSTRACT

Disclosed is a process for recovering chromium, vanadium, molybdenum, and tungsten from secondary resources such as alloy scrap comprising a refractory metal and base metals such as cobalt, nickel, iron, and copper. The scrap is calcined with sodium carbonate in air to convert the refractory metal values to $MoO_4^=$, $VO_4^=$, $WO_4^=$, and $CrO_4^=$ and the base metals to water insoluble oxides. A leach of the calcined materials produces a pregnant liquor rich in refractory metals which, after separation of the vanadium, molybdenum and tungsten values, is treated with CO, CHOO$^-$CH$_3$OH, or HCHO to reduce $Cr^{+6}$ to $CR^{+3}$. The carbonate and bicarbonate salts produced as a byproduct of the reduction are recycled to the calcination stage.

As a result of the V, W, and Mo partition, a mixed solid comprising $CaO.nV_2O_5$, $CaMoO_4$, and $CaWO_4$ is produced. This is treated with carbonated water or formic acid to selectively dissolve vanadium values which are subsequently recovered by precipitation or extraction. The remaining mixed $CaWO_4$ and $CaMoO_4$ solid is treated with $H_2O_2$ and sulfuric acid to reject a Mo and W-free $CaSO_4$ precipitate, and to produce a concentrated solution of tungsten and molybdenum. The W values are selectively precipitated from this solution by decomposing the peroxy complexes. The process has the advantages that a wide variety of different feed materials can be treated, no energy intensive pyrometallurgy is involved, reagent comsumption is minimized, and no aqueous effluents are produced.

20 Claims, 11 Drawing Figures 4,298,581

PROCESS FOR RECOVERING CHROMIUM, VANADIUM, MOLYBDENUM AND TUNGSTEN VALUES FROM A FEED MATERIAL

BACKGROUND OF THE INVENTION

This invention relates to the recovery of refractory metal values from secondary resources such as scrap alloy.

A significant volume of alloy scrap of a type comprising one or more metals such as chromium, molybdenum, vanadium, and tungsten alloyed with one or more base metals such as iron, copper, nickel and cobalt is available in the United States. Examples of such materials include superalloys, corrosion and oxidation resistant alloys used in fabricating process equipment, steam and gas turbines and the like, spent desulfurization catalysts used in the petroleum industry, hardfacing grindings, tool steels, and related material.

While both the refractory metal values in such alloys as well as the nickel, cobalt and copper values represent a significant recycleable resource, attempts to recover these metals by an economically attractive process have not been very successful. Any recovery scheme involving remelting of the alloys necessarily requires a large and expensive energy input, especially in view of the high melting points of the refractory metals and the escalating costs of energy. Dissolution and selective extraction techniques which employ organic extractants can be designed for treating materials of a selected composition. However, the availability of scrap materials of more or less uniform composition is rather low and unpredictable. Consequently, a recovery process which is limited to the use of only one particular type of feed material cannot take advantage of the economics of scale and can often be placed in operation only on a noncontinuous basis. This results in a relatively poor utilization of capitabl equipment.

The inventions disclosed herein were developed with a view to designing an overall processing system for the recovery of both refractory metal values as well as nickel, cobalt, and copper from feed materials varying in the ratio of the various metals they contain, the identity of the metals alloyed together, and the state of oxidation, if any, of the metals. The logic of the approach was that a processing scheme capable of treating feeds of varying composition would largely overcome the problems arising from variation in the availability and cost of the various specific types of feed material and could be used on a continuous basis. The system was also sought to be designed so as to be able to handle conventional chromite and wolframite ores which could be mixed with the secondary feed materials as desired. Other bread objectives of the overall process disclosed herein are to reduce or eliminate the volume of effluents associated with the process and to eliminate environmentally dangerous effluents. Still another goal was to provide a secondary metal processing system which avoided any remelting step and which minimized reagent consumption.

The overall processing system involves a number of separate inventions which, in preferred embodiments, are employed in connection with each other. However, each of the separate inventions may be used individually in an appropriate situation, and it is not required that a single system embodying all the processes be used. In the overall processing scheme, feed materials are first calcined in the presence of an oxygen containing gas and an alkali metal carbonate, bicarbonate, or hydroxide. As a result of the calcination, chromium, vanadium, molybdenum and tungsten are converted respectively to chromates, vanadates, molybdates, and tungstates. The base metals are converted to water insoluble oxides. After the calcination, the mixture is water leached to produce a leach residue containing iron, nickel, cobalt, silicon, aluminum, and/or manganese and a leach liquor containing dissolved alkali metal chromate, tungstate, molybdate and vanadate. After preliminary purification, to remove soluble silicates, aluminates, and/or phosphates, the leach liquor is treated with alkaline earth metal ions, typically calcium ions, to selectively precipitate molybdenum, tungsten, and vanadium values as a mixed calcium cake. After separation of the molybdenum, tungsten, and vanadium values, the leach liquor, pregnant with chromium values, is reduced with carbon monoxide or low molecular weight oxygenated hydrocarbons. The reduction results in the precipitation of a hydrated chromium oxide product and in a spent liquor containing alkali metal salts of carbonate or bicarbonate which is dehydrated, the salts being recycled to the calcination step, and the water being recycled to leach.

Next, the calcium cake is treated with carbonated water or formic acid solution to selectively leach the vanadium values and some of the calcium. After separation of the vanadium containing liquor from the calcium molybdate and tungstate, the vanadium can be recovered by a variety of methods such as driving off some water and carbon dioxide content of the leach liquor, by adding a base such as calcium hydroxide to substantially quantitatively precipitate a product rich in $V_2O_5$, or by treating the liquor with sulfuric acid to precipitate calcium sulphate and thereafter recovering a pure vandium product by solvent extraction. The vanadium-barren calcium molybdate-calcium tungstate filter cake rejected from the vanadium stage is then repulped with water and the slurry is mixed with hydrogen peroxide and either sulfuric acid or a mixture of sodium bicarbonate and carbonated water. The presence of the hydrogen peroxide prevents the precipitation of molybdate and tungstate ions, and a calcium sulfate or calcium carbonate byproduct results which contains only trivial amounts of molybdate or tungstate. The molybdenum and tungsten values from the aqueous phase are then selectively extracted either by conventional techniques such as those disclosed in U.S. Pat. No. 3,969,478 or by heating the solution to decompose the peroxycomplexes and thus precipitate a hydrated $WO_3$ solid, adding ammonia base to the solution to raise the pH thereof to between about 2 and 3, and heating the solution to precipitate a hydrated ammoniacal $MoO_3$ product.

The process results in the production of valuable products of acceptable purity which are individually rich in chromium, vanadium, tungsten, and molybdenum. No aqueous effluents are produced, no energy intensive pyrometallurgical operation is involved, the reagents employed are all relatively inexpensive, and reagent consumption is minimized by recycle and other techniques.

Processes for calcining spent catalysts and other easily-calcined alloys are known in the art. However, the calcination and subsequent leaching of oxidation resistant superalloys is a novel approach to obtaining refractory metal values, and is disclosed in detail and claimed in copending application Ser. No. 140,428, filed Apr. 15, 1980. Processes for separating the Mo,W, and V values from the leach liquor and subsequently reducing chromium are disclosed in detail and claimed in copending application Ser. No. 140,435, filed Apr. 15, 1980. Processes for selectively recovering vanadium from a mixed alkaline earth metal solid filter cake containing molybdenum, tungsten, and vanadium values are disclosed in detail and claimed in copending application Ser. No. 140,569 filed Apr. 15, 1980. Processes for rejecting alkaline earth metal ion from a mixed alkaline earth metal molybdate and tungstate cake and subsequently recovering the molybdenum and tungsten values are disclosed in detail and claimed in copending application Ser. No. 140,436 filed Apr. 15, 1980. All of the foregoing applications were filed on even date herewith and their disclosures are incorporated herein by reference.

This application relates to the process of recovering hydrated chromium oxide from a solution containing $Cr^{+6}$, and optionally, molybdenum, tungsten, and vanadium values.

SUMMARY OF THE INVENTION

The instant invention relates to the overall process for recovering chromium, molybdenum, tungsten, and vanadium values from a feed material containing these values and one or more of nickel, cobalt, iron, and copper values. The feed material preferably comprises one or a mixture of oxidation resistant superalloy scrap, tool steel scrap, hardfacing scrap, spent catalysts, chromite ores, and wolframite ores.

The feed material is calcined in an oxygen containing atmosphere, e.g., air, and in the pressure of sodium carbonate or its equivalent sodium bicarbonate or sodium hydroxide. As a result of the calcination, the Mo, V, Cr, and W values in the feed are converted to water soluble sodium molybdates, vanadates, chromates, and tungstates, and the base metals are converted to insoluble oxides. A subsequent water leach allows the separation of a leach residue from which nickel, cobalt, and/or copper values may subsequently be recovered by convential reduction and hydrometallurgical techniques, and a $Mo^{+6}$, $V^{+5}$, $Cr^{+6}$, and $W^{+6}$ pregnant alkaline leach liquor. After a preliminary purification procedure involving the removal of soluble silicates, aluminates and/or phosphates, the $Mo^{+6}$, $V^{+5}$ and $W^{+6}$ content of the leach liquor is reduced to levels low enough to allow the subsequent reduction and recovery of a chromium product of acceptable purity. This is accomplished by treating the liquor with calcium ions to selectively precipitate $nCaO \cdot V_2O_5$, $CaMoO_4$, and $CaWO_4$ as a mixed calcium cake. The leach liquor, now low in $V^{+5}$, $Mo^{+6}$ and $W^{+6}$ values, is then treated with a carbon containing reducing agent to produce a hydrated chromium oxide ($Cr^{+3}$) product and a spent liquor containing residual V, W, Mo and Cr values and the sodium salts of the oxidation product of the reducing agent, $CO_3^=$, mixed with some $HCO_3^-$. The spent liquor may subsequently be treated to recover the mixture of metal values, carbonates, and bicarbonates for recycle, and to recycle its water content to the leaching stage. During the precipitation of the calcium cake, the addition of acid promotes an efficient partition. Preferably, the added acid is formic acid. The resulting formate ions report in the aqueous phase of the separation and may be used in the chromium reduction.

The mixed cake of vanadium, tungsten, and molybdenum values is next treated with water and $CO_2$, preferably at superatmospheric pressures, to selectively dissolve the vanadium values and a friction of the calcium, while leaving the $CaMoO_4$ and $CaWO_4$ behind. The resulting vanadium-rich liquor is then treated to recover vanadium. Residual metal values in the carbonated aqueous phase may then be recycled together with the carbon dioxide. Formic acid can be used to treat the cake a second time to recover additional vanadium. The resulting solution, containing vanadium and formate ions, is then recycled.

The mixed $CaWO_4$-$CaMoO_4$ cake rejected from the vanadium recovery stage is then subjected to a process wherein the Mo and W are together dissolved from the calcium cake while simultaneously precipitating calcium as a solid salt. Preferably, this step is done by adding $H_2O_2$ and an acid such as $H_2SO_4$ to the cake to produce $CaSO_4$ and an aqueous acidic solution containing molybdenum and tungsten. Alternatively, $H_2O_2$, $NH_4HCO_3$, and carbonated water may be used, in which case calcium is rejected as $CaCO_3$. The Mo and W values in the aqueous phase are typically present in high concentration and may subsequently be partitioned and recovered.

Objects of the invention include the provision of a process for recovering refractory metal values from secondary sources characterized by various different ratios and various states of oxidation of the metals of interest, to provide a process which generates no aqueous effluents, and to provide a process involving no energy intensive pyrometallurgical steps. Another object of the invention is to provide such a process wherein reagent consumption is minimized, and the necessary reagents are of the relatively inexpensive variety. Still another object is to recover acceptably pure chromium products, vanadium products, tungsten products, and molybdenum products from a mixed feed material containing these and other metal values.

Further advantages and features of the invention will be apparent to those skilled in the art from the following description of some preferred embodiments and from the drawing.

BRIEF DESCRIPTION OF THE DRAWING

FIG. 11 is a schematic diagram illustrating a second method of recovering Mo and W from the calcium cake rejected from the vanadium recovery stage (at B) with simultaneous rejection of calcium.

Like reference characters in the respective drawn figures indicate corresponding stages.

DESCRIPTION OF THE PREFERRED EMBODIMENT

Feed Material

Figure 1:
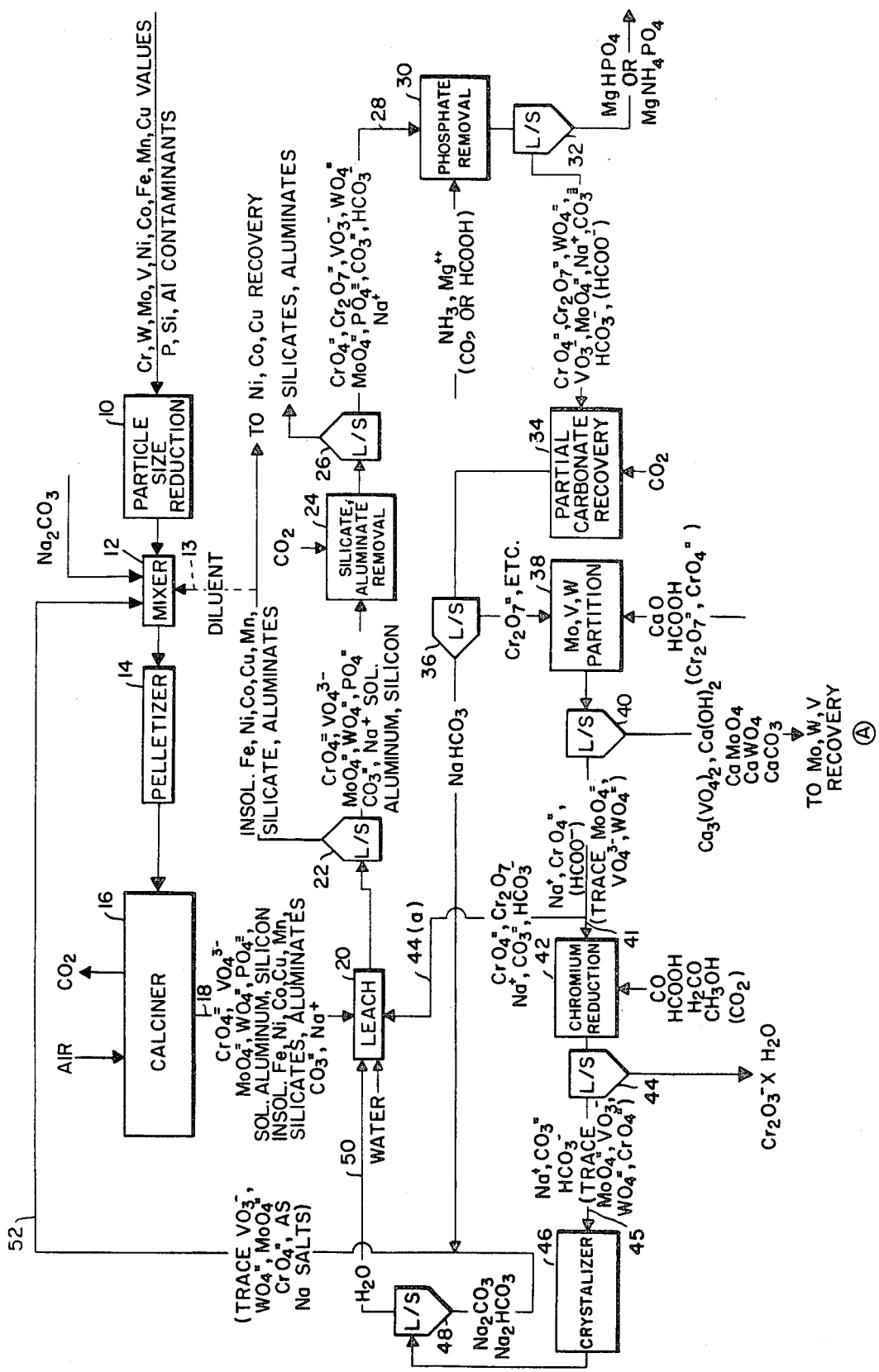
FIG. 1 is a schematically illustrated system for recovering chromium values from a solid feed material containing chromium as well as molybdenum, vanadium, and tungsten.

The feed materials for use in the process disclosed herein comprise chromium containing scrap metal values such as oxidation resistant superalloys, refractory alloys, hardfacing grindings, tool steels, spent catalysts and the like. The quantity, composition, location, availability, and price of such materials generally vary widely and are influenced by economic and even political factors. In order to make the process less dependent on such ill-defined variables, the instant process is designed so as to be able to accommodate feed materials of varying composition and varying ratios of the metals of interest: Cr, Mo, V, W, Ni, Co, Fe, Mn and Cu. Furthermore, the secondary material feed may be admixed with chromite and wolframite ores, in various proportions, in order to further increase its independence from any single feed material and to achieve other advantages as disclosed herein.

While it is known that chromite ores can be calcined to render their chromium values to a water leachable form, it has only recently been discovered that oxidation resistant alloys, under certain conditions, are also amenable to such treatment. This discovery expands the scope of use of the processes disclosed herein. Furthermore, by mixing oxidation resistant superalloys and other alloys with materials in a more oxidized state (such as $Cr_2O_3$) a considerable energy savings is realized, since the fusion of metallics in an exothermic reaction whereas chromite ores must be supplied with heat to attain high chromium yields. As explained in detail below, the addition of chromite and/or wolframite ores to the metallic feed also allows one to set the Cr/(Mo,V,W) ratio such as to optimize the recovery of each. In addition, it is possible to set the ratio of feed materials such that, unlike the calcination practiced on chromite ores, no diluent material need be added. Thus, the iron content of some refractory or corrosion resistant alloy scrap amenable to the process substitutes for separately added diluent.

Typical nonlimiting compositions (weight percents) for feed materials useful in the process of the invention are set forth below.

| Oxidation Resistant Superalloys | | | |
|---|---|---|---|
| | Alloy A | Alloy B | Alloy C |
| Ni | 55.0 | 47.0 | 22.0 |
| Co | 2.5 | 1.5 | 39.0 |
| Fe | 5.5 | 19.0 | 1.5 |
| Cr | 15.5 | 22.0 | 22.0 |

| Oxidation Resistant Superalloys | | | |
|---|---|---|---|
| Mo | 16.0 | 9.0 | 0.0 |
| W | 3.8 | 1.0 | 14.5 |
| Other | 1.0 | 1.0 | 1.0 |

| | Hardfacing Grindings | | Chromite Ore |
|---|---|---|---|
| Ni | 12.9 | Cr | 30.5 |
| Co | 18.7 | Fe | 19.3 |
| Fe | 14.4 | O | 32.6 |
| Cr | 18.0 | Si | 1.5 |
| Mo | 0.14 | Al | 8.2 |
| W | 10.3 | Mg | 6.2 |
| Al | 4.3 | V,Ni,Co | 1.8 |
| Si | 0.3 | | |
| Other | 17.7 | | |

| Tool Steel Grindings | | Spent Catalyst A | | Spent Catalyst B | |
|---|---|---|---|---|---|
| | | Ni | 5.7 | Co | 3.4 |
| | | W | 1.0 | Mo | 4.7 |
| Fe | 52 | other | 93.3 | other | 91.9 |
| Cr | 1.9 | | | | |
| Mo | 4.4 | | | | |
| W | 1.3 | | | | |
| V | 1.1 | | | | |
| oil | 25.0 | | | | |
| Other | 14.6 | | | | |

Calcination

In the process, the alloys containing chromium and one or more of molybdenum, vanadium, and tungsten values and one or more of nickel, cobalt, copper and iron values are at the outset treated to partition the chromium, molybdenum, vanadium and tungsten values from the remaining metal values without an energy intensive remelting step. Broadly, the partition is accomplished by calcining scrap grindings, dusts, and/or fines, optionally together with chromite and/or wolframite ore in the presence of an oxygen containing gas and an alkali metal (typically sodium or potassium) carbonate, bicarbonate, or hydroxide at a temperature above about 800° C., preferably 950° C. to 1150° C. During the calcination, $CO_2$ gas is liberated. Surprisingly, it has been found that subject to certain particle size limitations of the scrap feed and to the presence of sufficient alkali metal salt, even oxidation resistant superalloy can be calcined to convert in excess of 90% of its chromium, tungsten, and molybdenum values to water soluble anions. The vanadium content of tool steel alloys is converted to vanadate. The copper, nickel, cobalt, manganese and iron values, on the other hand, are converted to water insoluble metal oxides. Thus, a subsequent leach of the calcined mixture with water will produce an iron, nickel, manganese, copper and/or cobalt rich mixture of oxides as a leach residue and a leach liquor loaded with chromate, tungstate, vanadate, and molybdate ions. The metals of interest in the leach residue, particularly nickel and cobalt, may be reduced and subsequently recovered by conventional hydrometallurgical techniques such as an ammoniacal leach which separates the iron from nickel, cobalt, and/or copper. Chromium, tungsten, vanadium, and molybdenum are recovered from the pregnant leach liquor as disclosed herein.

In the case of oxidation resistant superalloy scrap, as the particle size of the feed material increases above a level of about 500 microns, the partition becomes increasingly less effective. Thus, when superalloy turnings having a nominal diameter of about 1 mm are used as a feed, significantly less than half of the refractory metal values are converted to water leachable form. Accordingly, the particle size of a substantial portion of the feed material must be less than about 500 microns and preferably less than 400 microns. Dusts, fines, and grindings will often be available in this size range, but particle size reduction may be required in particular cases.

While the presence of particles of the size set forth above is essential to the success of the superalloy calcination, it has been discovered that a mixed feed of finely divided material and larger size scrap having nominal dimensions in the 500 to 1500 micron range are well suited for treatment. It is believed that the successful calcination of the larger scrap is due to the fact that the finely divided component of the feed is capable of retaining molten alkali metal salts within the bulk and thus of ensuring a good contact between the reacting metal surface, alkali metal values and the oxygen. Without the fines, the molten alkali metal salts will drain off the larger metal particles, thus separating the reacting species. In general, such mixed feeds should comprise no more than about 50% by weight particles in the larger range mentioned above.

Calcination of mixtures of such materials can be expected to produce at least some water soluble $NaAlO_2$ and $Na_2SiO_3$. In order to inhibit the formation of these salts, some $CaCO_3$ may be mixed with the feed prior to the calcination. Since at typical roasting temperature $Na_2CO_3$, $Na_2CrO_4$, etc. are molten, diluent may be added if required in order to adjust the liquid to solid ratio to a sufficiently low value for proper operation of the calciner. The diluent used is desirably composed of the solid dried residues obtained upon separation of the pregnant leach solution from its associated leach residue. The calcination is accomplished in an oxygen containing atmospherre preferably in a directly fired rotary kiln. When feeds rich in metallics are employed, once initiated, the calcination is self-sustaining. Residence times in the kiln are on the order of one to four hours, depending on the nature of the feed employed.

Leaching

The calcined product is next subjected to an aqueous leach in order to dissolve the chromates, vanadates, tungstates, molybdates and excess sodium carbonates and hydroxides. Countercurrent leaching systems can be employed for this operation. The leach is preferably conducted with recycled spent leach liquor which results after separation of the vanadate, tungstate, and molybdate values and the chromium product. The recycled spent leach liquor may contain alkali metal carbonates, bicarbonates, and hydroxides, as well as low concentrations of alkali metal chromates, dichromates, vanadates, tungstates, and molybdates. As will become evident hereinafter, an important characteristic of the process of the invention is that it provides the capability for controlling and maintaining the concentrations of the various components in the spent leach liquor at desired values. Makeup water is added to the recycled leach liquor as necessary in order to compensate for water losses normally associated with separation of the chromium product, the drying of the carbonate/bicarbonate by-product and separation of vanadium, molybdenum, and tungsten. The temperature and the solution-to-solids ratio in the leach is preferably adjusted such as to maximize the concentrations of refractory metal salts, carbonates, and hydroxides in the pregnant liquor while minimizing precipitation problems. The preferred range of leach temperature is 50° to 90° C., more preferably 80° C. The preferred solution-to-solids ratio is such that chromium solubilization in excess of 99% is obtained and that the alkali metal concentration of the pregnant liquor is at least about 1.0 M, preferably 5 M–8 M.

The pregnant leach liquor and residue containing oxides of Ni, Co, Fe and/or Cu is next subjected to a solid/liquid separation which can conveniently be conducted by filtration. Part of the leach residue may be used as a diluent during calcination. It thus is blended with finely ground feed, optionally calcium carbonate, and recycled alkali metal carbonates/bicarbonates. The remainder of the leach residue may be reduced and treated by conventional hydrometallurgical techniques to recover nickel, cobalt, and/or copper.

Preliminary Leach Liquor Purification

If excess silicates and/or aluminates are present in the pregnant liquor, its pH may be adjusted to about 9 to precipitate alumina and silica. The pH adjustment is preferably accomplished with $CO_2$ gas and/or formic acid. The alumina and silica are then removed by a solid-liquid separation.

Often, scrap metals will be contaminated with cutting oils. The bulk of such contaminates may be removed by conventional degreasing techniques, and that which is not removed is readily oxidized and volatilized at the temperature of the calcination. However, the cutting oil contaminants frequently include a phosphorous component, at least a fraction of which is oxidized to phosphate during the calcination and leached together with the refractory metals of interest. Since the presence of $P^{+5}$ in leach liquors can interfere with the acidic reactions subsequently employed to recover and separate the refractory metals, it is preferred to remove phosphate from the leached liquor. This may be accomplished by two related but separate methods.

In the first, when a carbonate or bicarbonate alkali metal salt has been used during the calcination, the concentrated leach liquor will contain significant amounts of carbonate ions. In order to reduce the level of carbonate ions in solution, the pH of the pregnant liquor is reduced with, for example, carbon dioxide, so that the equilibrium;

$$H^+ + CO_3^{2-} \rightleftharpoons HCO_3^-$$

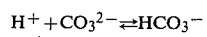

is pushed to the right so that the predominant species is bicarbonate. In addition, the pH must be maintained at such a level that significant amounts of the phosphate is present as the $HPO_4^{2-}$ species. The exact optimum pH for ensuring that the $HCO_3^-$ species predominates while the phosphate species is present mainly as $HPO_4^{2-}$ depends on solution temperature and ionic strength. With essentially saturated leach solutions maintained at 80° C., the optimum pH for phosphate removal is in the range of 7.5 to 9.0 and preferably at about 8.5. Thereafter, magnesium ion is added to the liquor to precipitate $MgHPO_4$. The conversion of the bulk of the $CO_3^{2-}$ ions to $HCO_3^-$ is necessary in order to prevent excessive consumption of $Mg^{+2}$ by precipitating $Mg^{+2}$ as $MgCO_3$ which has a solubility product which is the same order of magnitude as that of $MgHPO_4$. In order to lower the phosphate level to the acceptable range (below about 0.02 grams per liter), substantial quantities of magnesium ion must be added. This results in a certain amount of contamination of the leached liquor with free magnesium ion. Depending on the choice of subsequent metal recovery steps, this may be tolerable and accordingly comprises a suitable technique under certain conditions.

The second method involves the formation of $MgNH_4PO_4$. In order to effect the precipitation of $MgNH_4PO_4$, pH control must again be employed. The pH of the system must be reduced to a level such that $Mg^{+2}$ is not removed from solution as $Mg(OH)_2$ but is utilized in formation of $MgNH_4PO_4$. The optimum pH for effecting this precipitation depends on solution temperature and ionic strength. With essentially saturated leach solutions at 80° C., the optimum pH is within the range of 8.5 to 10.0 and preferably at about pH 9.0. The $MgNH_4PO_4$ has a very low water solubility and thus, magnesium contamination of the solution is much less of a problem. However, it involves the addition of both $Mg^{+2}$ (as MgO or $Mg(OH)_2$) and ammonium ion (as $NH_3$ or $NH_4OH$) to the solution. The latter must be present in significant concentrations and must be dealth with subsequently. With essentially saturated leach solution adjusted to pH 9.0 at 80° C., the addition of both MgO and $NH_3$ to about 0.04 moles per liter is effective in reducing the phosphate level well below that which creates subsequent processing difficulties.

Molybdenum, Tungsten, and Vanadium Partition

In the next step of the process, the vanadate, molybdate, and/or tungstate ions are partitioned from the chromate values in the leach liquor. If, however, the concentration of these values is sufficiently low, this step may be eliminated entirely, since, as disclosed below, a substantially pure chromium product can be produced in the presence of small vanadate, tungstate, and/or molybdate concentrations. Alkaline earth metal ions (preferably calcium because of its low cost) precipitate vanadate, molybdate, and tungstate preferentially to chromate and dichromate. Accordingly, the concentration of these values may be reduced by adding $Ca^{++}$ ions to the leach liquor and subsequently separating the resulting precipitate.

In order to fully achieve the recycle benefits of the process of the invention and to avoid unnecessary introduction of foreign anions, such as chlorides, it is preferred that the ionic alkaline earth metal precipitant be calcium hydroxide or calcium oxide which hydrates to calcium hydroxide. Acetates or formates of barium or calcium, or their mixtures, may also be used. For essentially saturated leach solutions at 80° C., the pH during precipitation is maintained at no greater than 13 by partial neutralization with an acid. Preferably, the acid used is formic acid, since the resulting formate anions may be used as a reducing agent for chromium in a subsequent stage of the process. Acetic acid may also be used. Prior to its addition, the $Ca(OH)_2$ may be partially or completely neutralized with formic acid to produce a salt. The resulting $Ca(CHOO)_2$ is equivalent to the addition of acid plus $Ca(OH)_2$ to the solution. Preferably, the temperature is within the range of about 50° C. to about 90° C. The preferred temperature is 80° C.

Utilizing $Ca(OH)_2$ as the precipitant, it is believed that the following equilibria are established.

$$4Ca(OH)_2 + 2NaVO_3 \rightleftharpoons Ca_3(VO_4)_2 \cdot Ca(OH)_2 + 2NaOH + 2H_2O$$

$$Ca(OH)_2 + Na_2MoO_4 \rightleftharpoons CaMoO_4 + 2NaOH$$

$$Ca(OH)_2 + Na_2WO_4 \rightleftharpoons CaWO_4 + 2NaOH$$

$$Ca(OH)_2 + Na_2CO_3 \rightleftharpoons CaCO_3 + 2NaOH$$

To ensure that the equilibria are shifted to the right, the $OH^-$ concentration should be maintained at less than 0.7 moles/l, and preferably below about 0.2 moles/l. Thus, the addition of acid promotes high precipitate yields. However, the amount of acid added should not be so large that the $OH^-$ concentration falls significantly below about 0.01 moles/liter because at lower $OH^-$ concentrations incomplete precipitation of $V^{+5}$ will result after addition of the stoichiometric $Ca^{++}$ requirements. Further, in order to minimize the formation of $CaCrO_4$, the precipitation should be conducted under conditions where the $Ca^{++}$ concentration in solution is sufficiently small so that the solubility product of $CaCrO_4$, i.e., $[Ca^{++}][CrO_4^=]$, is not exceeded. At $OH^-$ concentrations in excess of 0.05 moles/liter, the solubility of $Ca(OH)_2$ is sufficiently small that the $Ca^{++}$ concentration is less than that which would result in precipitation of $CaCrO_4$. The addition of calcium formate to the alkaline leach solution has little effect on pH.

As mentioned, the choice of the calcium oxide precipitant in the process of the invention is important because all solutions, as well as the alkali metal carbonates/bicarbonates, either as solids or as slurries, are preferably recycled after the chromium and the molybdenum/tungsten/vanadium products are separated. The recycle of these solutions is an important feature of the process of the invention. It is well known, for example, that calcium chloride can be used to precipitate molybdates and tungstates from solution. However, use of this compound would introduce chloride ions into the chromate solution and would therefore require removal of the chloride ions prior to recycle of the solution, since the presence of chlorides during calcination fosters corrosion.

The separation of chromates from molybdates, vanadates, tungstates, and carbonates is feasible because the solubility of $CaCrO_4$ is much greater in aqueous alkaline solution than the solubilities of $CaMoO_4$, $CaCO_3$, $Ca_3(VO_4)_2$, $Ca(OH)_2$, and $CaWO_4$. In turn, the solubilities of $CaMoO_4$ and $CaCO_3$, under similar conditions, are each greater than that of $CaWO_4$ and $Ca_3(VO_4)_2$. $Ca(OH)hd 2$. However, in practice, the precipitate will usually be contaminated with a small quantity of alkaline earth metal chromate. The extent of contamination of the alkaline earth metal-precipitated product with chromate is minimized when less than complete precipitation of $MoO_4^=$ occurs. Thus, when 90-95% of the $MoO_4^=$ present in solution is precipitated, essentially all the $W^{+6}$ and $V^{+5}$ are precipitated, and less than 2% of the original $Cr^{+6}$ content of the leach liquor typically reports in the precipitate. Thus, Mo, V, and W may be separated from the chromium values which remain in solution.

An important further discovery is that digestion of the alkaline earth metal $MoO_4^=$, $WO_4^=$, $VO_4^=$, $CO_3^=$, product with an acid in the pH range of 2–7 selectively dissolves the alkaline earth metal values associated with both the $CO_3^=$, (with $CO_2$ evolution) and $VO_4^=$, as well as the $V^{+5}$, leaving behind a reasonably pure insoluble $CaMoO_4/CaWO_4$ product. Preferably, the acid employed in the digestion is formic acid, thereby producing alkaline earth metal formate in solution which may, after $V^{+5}$ removal, be recycled for use as a precipitant. Sufficient water is introduced so as to avoid exceeding the solubility limit of alkaline earth metal formate produced during the digestion. The temperature range employed for the digestion is from about room temperature to about 90° C. Substantial removal of chromium impurity as well as vanadium from the molybdenum/tungsten precipitate can be achieved during the digestion by controlling the quantity of formic acid added, the temperature, the solution to solids ratio, and the residence time. By so doing, Cr to Mo and V to Mo weight ratios of less than 0.006 and 0.015, respectively, can be obtained in the alkaline earth metal molybdate/tungstate product. Thus, at higher temperatures (up to about 80° C.), an amount of formic acid in excess of that necessary to dissolve alkaline earth metal carbonate, and relatively lengthy residence times are preferred in order to obtain efficient removal of chromium. Under these conditions the formic acid reduces the $Cr^{+6}$ of alkaline earth metal chromate present in the solution to $Cr^{+3}$, the latter being soluble in the formic acid solution. Chromium (III) is not precipitated by alkaline earth metal ions in acid solution. At lower temperatures and shorter residence times, alkaline earth metal chromate is merely solubilized as dichromate and is removed from the precipitated product. Thus, a multiple role is performed by formic acid: (a) it dissolves the alkaline earth metal carbonate with elimination of $CO_2$ and thus upgrades the metal content in the product; (b) it removes some of the co-precipitated impurity chromium values and the bulk of the vanadium values from the alkaline earth metal precipitated product and thus upgrades its purity; (c) it converts the alkaline earth metal values associated with the carbonate and vanadate fraction of the precipitate to a form suitable for recovery and recycling in the process, thus minimizing alkaline earth metal consumption; (d) it lowers the pH during precipitation of molybdate/tungstate/vanadate and thus makes possible the use of alkaline earth metal hydroxide or oxide as the precipitant; and (e), as will be shown below, it takes part in the reduction of $Cr^{+6}$ to $Cr^{+3}$ and its products of oxidation can thus be recovered and recycled in the process.

The drawback of the foregoing separation technique is that rather large quantities of formic acid are employed. The acid introduced is subsequently utilized as a reductant; however, it nevertheless involves a significant reagent cost which should be minimized if possible. Accordingly, the Cr/(Mo,W,V) partition which follows is preferred.

Material balance calculations have shown that under the conditions which obtain in the leach liquor, the amount of formic acid consumed per liter of leach solution is given by:

$$[HCOOH] = [Na^+] - 2[Na_2CrO_4] - 6[Na_2Cr_2O_7] - 0.2$$

This rather simple expression results from the fact that all metal and impurity values are present as anions (typically with $Na^+$ as the counter ion) in the leach solution. Apart from $CrO_4^=$ and $Cr_2O_7^=$ (which is converted to $2CrOhd 4=$ by $2OH^-$), all anions in the leach solution are eventually replaced either by $HCOO^-$ or $OH^-$ ions. Since the final $MoO_4^=$, $VO_4^=$, and $WO_4^=$ concentrations in the leach solution (after $Ca^{+2}$ addition) is controlled by the $OH^-$ ion concentration, the final $OH^-$ ion concentration is fixed at about 0.2 moles/l. As can be seen from the equation, HCOOH consumption, under the requirements of the process, can be reduced by both reducing the $Na^+$ concentration and by increasing the $Cr_2O_7^=$ concentration of the leach solution (at the expense of the $CrO_4^=$ content).

These conditions can be obtained by addition of $CO_2$ to the system prior to the precipitation step so as to form significant amounts of $Cr_2O_7^=$ and $NaHCO_3$. The latter compound is rather insoluble in concentrated leach solutions and thus the $Na^+$ content of the leach solution is reduced by removal of solid $NaHCO_3$. Since the conversion of $CrO_4^=$ to $Cr_2O_7^=$ with $CO_2$ is more readily accomplished in the cold, and since the solubility of $NaHCO_3$ decreases with decrease in temperature, it is preferred to conduct the reaction at room temperature. It has been demonstrated that by first precipitating $NaHCO_3$ from the essentially saturated leach liquor in this manner, formic acid consumption can be reduced by between 45% and 67%, depending on the chromium content. The higher the chromium content, the greater the reagent saving. During the addition of $CO_2$, the following reactions are believed to occur:

$$2Na_2CrO_4 + 2CO_2 + H_2O \rightarrow Na_2Cr_2O_7 + 2NaHCO_3$$

$$Na_3VO_4 + 2CO_2 + H_2O \rightarrow NaVO_3 + 2NaHCO_3$$

$$Na_2CO_3 + CO_2 + H_2O \rightarrow 2NaHCO_3$$

Sodium chromate is thus converted to sodium dichromate and sodium bicarbonate, sodium orthovanadate is converted to sodium metavanadate and sodium bicarbonate, and sodium carbonate is converted to sodium bicarbonate. If the above reaction is conducted at low temperature (20° to 30° C.), and if the total amount of $NaHCO_3$ exceeds its solubility limit, then sodium bicarbonate precipitates out and can readily be removed from solution. The solubility of $NaHCO_3$ in water at 25° C. is 93 g/l, while its solubility in essentially saturated leach solutions containing sodium salts of chromium, molybdenum, tungsten and vanadium is on the order of 3–10 g/l.

Addition of CaO or $Ca(OH)_2$ to the $CO_2$ treated solution results in precipitation of a calcium cake containing calcium molybdate, tungstate, vanadate, and carbonate and in generation of NaOH. The NaOH produced converts the $Cr_2O_7^=$ to $CrO_4^=$. Thus, the consumption of formic acid can be greatly reduced or even completely eliminated in the process provided there is enough chromium as $Cr_2O_7^=$ in the pregnant liquor. The higher the chromium concentration and the higher the Cr to Mo/W/V molar ratio in the pregnant liquor, the lower will be the consumption of acid. The chromium concentration and the above mentioned ratio can be adjusted in the process by: (1) mixing chromite ore with the feed before calcination, (2) recycling a bleed stream from the chromium solution remaining after the (Mo/W/V)Ca cake precipitation step to the leaching of fused material until the desired Cr level is achieved, or (3) adding sodium dichromate or calcium chromate during precipitation of the calcium cake. More than one of these ways to increase the Cr level in solution can be used if it becomes technically or economically advantageous.

As mentioned previously, without the $CO_2$ pretreatment, substantial quantities of acid must be consumed in order to reduce the $MoO_4^=$, $VO_4^=$, and $WO_4^=$ concentrations to levels low enough so that a substantially Mo, V, and W free chromium product can be produced in the subsequent chromium reduction stage. Even with such a pretreatment, some acid will normally be required.

Chromium Reduction

It is known that a variety of reducing agents can be employed to reduce $Cr^{+6}$ to $Cr^{+3}$ under a wide range of conditions. However, it was discovered that only by using certain low molecular weight compounds of carbon and oxygen or carbon, oxygen, and hydrogen can the objectives stated earlier be met simultaneously. Carbon monoxide, methanol, formaldehyde, paraformaldehyde, and formate anions are suitable for this purpose. Acetate anions and methane may also be used.

The reductions of $Cr^{+6}$ to $Cr^{+3}$ employing these compounds proceed as follows:

$$2Na_2CrO_4 + 3CO \rightarrow Cr_2O_3 + Na_2CO_3 + 2NaHCO_3 \quad (1)$$

$$8Na_2CrO_4 + 3CH_4 \rightarrow 4Cr_2O_3 + 3Na_2CO_3 + 10NaOH + H_2O \quad (2)$$

$$2Na_2CrO_4 + CH_3OH \rightarrow Cr_2O_3 + Na_2CO_3 + 2NaOH + H_2O \quad (3)$$

$$4Na_2CrO_4 + 3HCOH \rightarrow 2Cr_2O_3 + 3Na_2CO_3 + 2NaOH + 2H_2O \quad (4)$$

$$4Na_2CrO_4 + 6HCOONa \rightarrow 2Cr_2O_3 + 6Na_2CO_3 + 2NaOH + 2H_2O \quad (5)$$

It has been discovered that the addition of $CO_2$ to the reactor during reduction has beneficial effect on reduction kinetics when the organic reducing agents are employed. In this case, reactions such as the following are believed to occur:

$$8Na_2CrO_4 + 3CH_4 + 5CO_2 \rightarrow 4Cr_2O_3 + 8Na_2CO_3 + 6H_2O \quad (6)$$

$$2Na_2CrO_4 + CH_3OH + CO_2 \rightarrow Cr_2O_3 + 2Na_2CO_3 + 2H_2O \quad (7)$$

$$4Na_2CrO_4 + 3HCOH + CO_2 \rightarrow 2Cr_2O_3 + 4Na_2CO_3 + 3H_2O \quad (8)$$

$$4Na_2CrO_4 + 6HCOONa + CO_2 \rightarrow 2Cr_2O_3 + 7Na_2CO_3 + 3H_2O \quad (9)$$

Where an excess of $CO_2$ is employed, some $NaHCO_3$ will also be produced. As shown by these equations, the reduction of sodium chromate to $Cr_2O_3$ in aqueous alkaline solutions by methane, methanol, formaldehyde, or formate ion in the presence of carbon dioxide results in production of byproduct sodium carbonate and/or sodium bicarbonate. This reduction may be carried out in a high pressure reactor such as a batch autoclave, a continuous discharge autoclave, or a continuous tubular reactor. In any case, the pregnant leach liquor, reductant, and carbon dioxide gas should be intimately contacted. Accordingly, vigorous mixing of the reduction ingredients will ensure that the rate of reduction will not be subject to the rate of diffusion of $CO_2$ into the leach liquor. A carbon dioxide stream can be generated in a reactor by burning coke, natural gas, petroleum fuel or the like. Recycle of $CO_2$ liberated during calcination may also be practiced.

The carbon dioxide partial pressure is preferably adjusted such that a sodium carbonate/bicarbonate solution is formed which has a pH, when measured at room temperature, in the range of 8.5–11.0. Such solutions are characterized by a relatively strong self-buffering effect. Employing methanol as the reductant, it was determined that the rate of reduction follows the equation:

$$-d[Cr^{+6}]/dt = k_2[Cr^{+6}]^{\frac{1}{2}}[CH_3OH]$$

where $[CH_3OH]$ is the liquid phase concentration of methanol. Integration of this equation under conditions where the molar concentration of methanol is equal to half that of $Cr^{+6}$ gives:

$$1/\sqrt{[Cr^{+6}]} = k_2 t/4 + 1/\sqrt{[Cr^{+6}]_i}$$

where $[Cr^{+6}]_i$ is the $Cr^{+6}$ concentration at time $t=0$. A similar expression applies when the reduction is done with $HCOO^-$. The activation energy for the reduction of $Cr^{+6}$ by methanol was calculated from experimental data and was found to be about 23 Kcal/mole. In order to obtain practical reduction rates, the reduction is carried out at elevated temperatures, and with at least the stoichiometric amount of reductant present. The preferred temperature range is from about 175° C. to 320° C. The preferred temperature is 260° C. The preferred range for the carbon dioxide partial pressure is 15–600 p.s.i.a. with the preferred pressure of about 200 p.s.i.a. These conditions apply to the use of both methanol or ionizable formates.

The reduction of $Cr^{+6}$ can be carried out until all $Cr^{+6}$ is reduced and the spent leach liquor contains only about 1–5 ppm of $Cr^{+6}$. However, an important characteristic of the process of the invention is that $Cr^{+6}$ need not be quantitatively reduced to recover the chromium values since both the spent leach liquor and the carbonates/bicarbonates remaining therein after separation of the $Cr_2O_3$ product are fully recycled in the process. In fact, it was discovered that whenever impurities such as molybdates, vanadates, and tungstates are present in the pregnant leach liquor, these impurities are predominantly left in solution as long as there is some quantity of $Cr^{+6}$ left in solution. Thus, by limiting the extent of $Cr^{+6}$ reduction, a selective precipitation of chromium oxide is achieved even in the presence of impurities such as molybdates, tungstates and vanadates.

Although the reduction of $Cr^{+6}$ is possible from solutions with $Cr^{+6}$ concentrations in the range from about 20 ppm to the saturation concentration at the chosen temperature, it is preferred to select the $Cr^{+6}$ concentration such that appreciable quantities of the carbonates/bicarbonates produced during the reduction do not precipitate. This of course is not a significant problem, especially when $NaHCO_3$ has been previously precipitated as disclosed above.

The solid and liquid products of reaction from the reduction are thereafter separated. Settling, thickening and/or filtration can be employed to achieve the separation of the solid product from the solution containing carbonate, bicarbonate, unreacted $Cr^{+6}$, etc. The $Cr_2O_3 \cdot nH_2O$ product can be washed with water or a NaOH solution, and the spent wash solution used as the $H_2O$ makeup discussed hereinbefore. Alternatively, the product may be washed with formic acid and water and the acid wash solution then utilized in the treatment of the $Ca^{++}$ cake as described above. The hydrated chromium oxide obtained from the process of the invention is green in color. Where separation is achieved by filtration, the chromium oxide filter cake usually contains about 65 wt% solids as opposed to chromium filter cakes obtained by prior art processes, which typically contain 5–35% solids. The higher solids content of the filter cake typically produced by the process of this invention facilitates its washing, improves its purity, and minimizes the energy requirements for drying and/or dehydration.

From equation 3 set forth above, it can be appreciated that in the reduction of an alkali metal chromate (and/or dichromate) by methanol, one mole of methanol is required to reduce two moles of chromate to one mole of $Cr_2O_3$. During the reduction, the methanol is oxidized to $Na_2CO_3$. As the reduction proceeds, the pH increases due to formation of NaOH. Thermodynamically this reduction is highly favored at any pH. Apparently, the rate of reduction depends inversely on the concentration of hydroxyl ions. However, as noted previously, the decrease in the rate of $Cr^{+6}$ reduction can be prevented or at least substantially ameliorated by introducing $CO_2$ under pressure into the reduction zone. The amount of $CO_2$ required to scavenge the sodium hydroxide generated during reduction by methanol may be calculated from the above equations. In actual practice, however, it is much more convenient to run the reduction reaction in the presence of a constant but positive partial pressure of $CO_2$. Under these conditions, the rates of reduction are typically 20 to 30 times greater than in the case in which no $CO_2$ is added. If a substantial excess of $CO_2$ is employed, then it is possible that under certain conditions some $NaHCO_3$, which is less water-soluble than $Na_2CO_3$, may precipitate during the reduction. The preferred amount of $CO_2$ introduced into the reduction step is that which results in a 2:1 bicarbonate/carbonate mixture. The pH of such a mixture, measured at ambient conditions, is in the range of 8 to 9.

Reduction of $Cr^{+6}$ by formate ions proceeds as shown in reaction 5. Three moles of $HCOO^-$ are required to reduce two moles of $Na_2CrO_4$. During the reduction, the formate ions are oxidized to sodium carbonate. For each mole of $Na_2CrO_4$ reduced, one half mole of NaOH is generated. As in the case of methanol reduction, the introduction of $CO_2$ results in a significant increase in the reduction rate. Carrying out the reduction in the presence of $CO_2$, using formate ion as the reductant species, proceeds according to equation 9. The preferred conditions relative to $CO_2$ partial pressure are similar to those in the methanol case.

Figure 4:
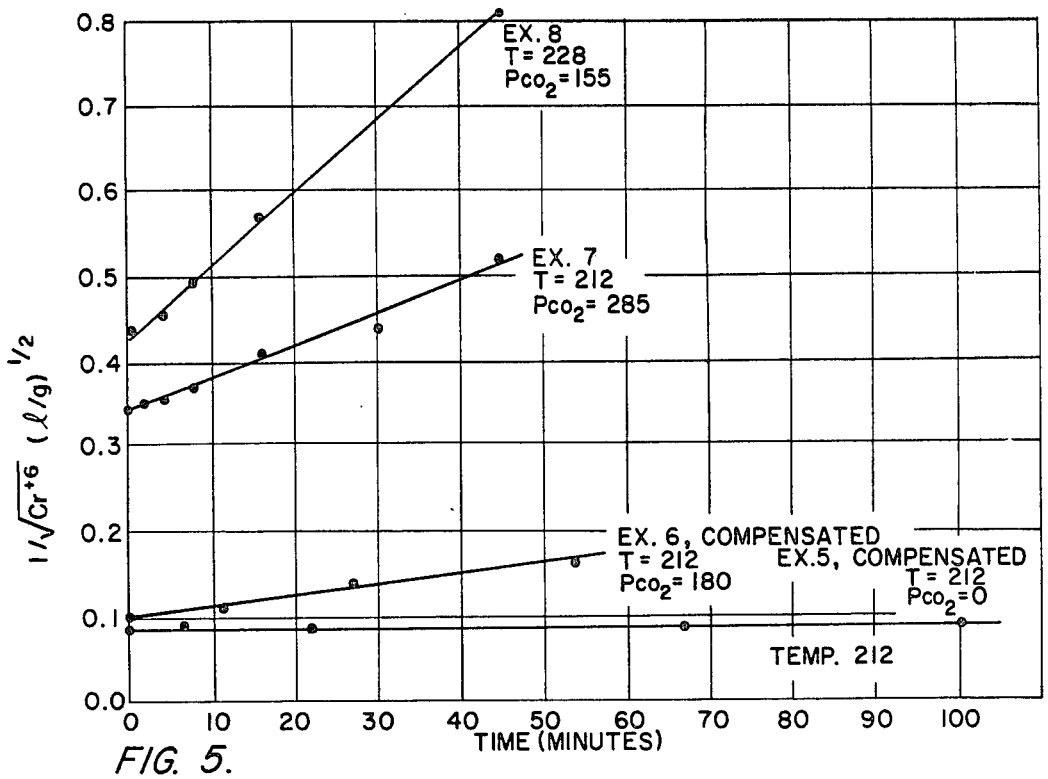
FIG. 4 is a graph disclosing the kinetics of $Cr^{+6}$ reduction by methanol at various temperatures and carbon dioxide partial pressures.
Figure 5:
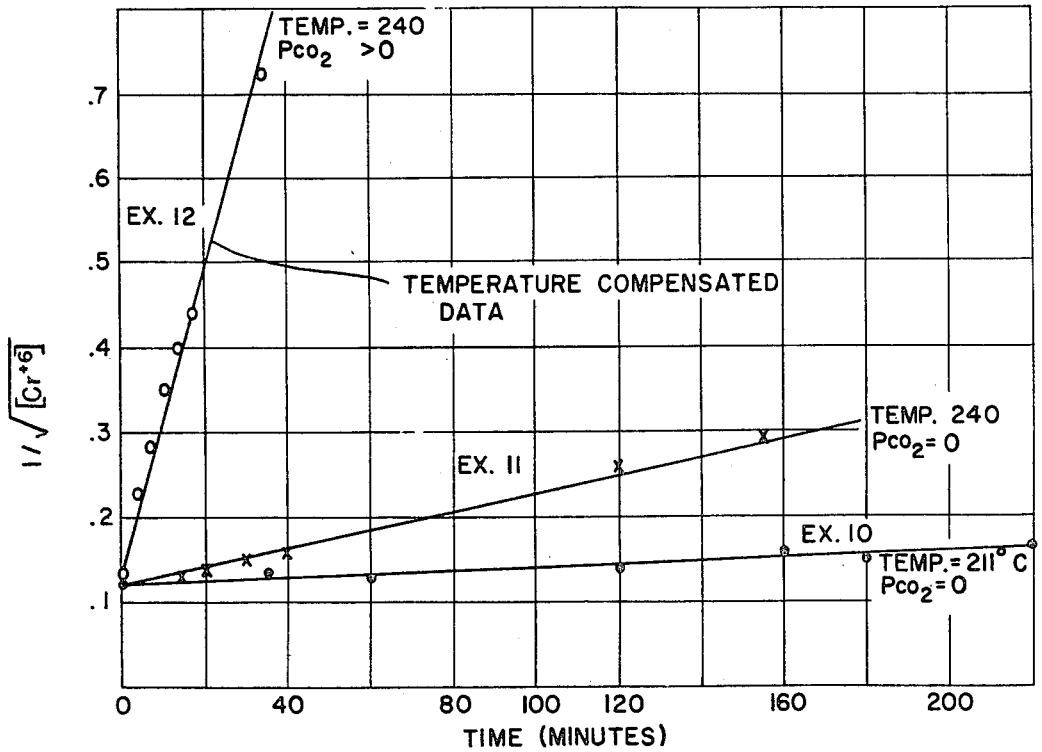
FIG. 5 is a graph disclosing the kinetics of $Cr^{+6}$ reduction by formate ion at various temperatures and carbon dioxide partial pressures.

FIGS. 4 and 5 are graphs disclosing the kinetics of $Cr^{+6}$ ion reduction to $Cr^{+3}$ by methanol and formate ions, respectively, at different temperatures and carbon dioxide partial pressures. The preferred temperature range for the reduction by formate is from about 190° C. to 310° C. The preferred temperature is about 260° C.

The green hydrated chromium oxide obtained by reducing $Cr^{+6}$ in alkaline solutions with methanol, formate ions or mixtures thereof is insoluble in either acids or bases. It has now been discovered that under certain conditions formaldehyde (or paraformaldehyde) reduces $Cr^{+6}$ in alkaline solutions such as to yield an acid-soluble hydrated chromium oxide product. Depending on conditions, formaldehyde is oxidized by $Cr^{+6}$ ions in alkaline solutions either to formate or to carbonate/bicarbonate. At temperatures below about 150° C., oxidation of formaldehyde to formate is favored. Extrapolation of the kinetic data concerning $Cr^{+6}$ ion reduction by formate in alkaline solutions indicates that the rate of $Cr^{+6}$ reduction with $HCOO^-$, at pH 8–9 measured at room temperature, and at temperatures below about 150° C., is extremely slow. Thus, when slightly more than the stoichiometric amount of formaldehyde for complete reduction of $Cr^{+6}$ and formation of carbonates is added, the reduction can be carried out in two stages: (a) first, at temperatures below 150° C., to yield approximately half of the initial chromium content as acid-soluble hydrated chromium oxide precipitate, which precipitate is then separated from the solution; and (b) second, heating the remaining solution to a temperature above 190° C. to reduce the remaining $Cr^{+6}$ ion by the formate formed during the first reduction stage, thereby to result in an acid-insoluble chromium product which is then separated from the solution.

The reduction by formaldehyde at temperatures below about 150° C. occurs according to the following reaction:

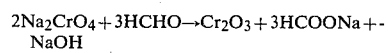

This equation indicates that the pH of the reaction system should rise as the reduction proceeds. Experimentally, however, it was discovered that in fact the pH drops from an initial preadjusted value of about 13 to about 9.6. Furthermore, the yield of $Cr_2O_3.nH_2O$ was much lower than expected. These results were attributed to side reactions involving formaldehyde such as the Cannizzaro reaction which is catalyzed by alkalies:

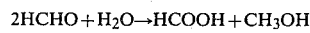

In addition, HCHO can condense with itself in an aldol type condensation to yield lower hydroxy aldehydes, hydroxy ketones and hexose sugars. The products of such side reactions do not partake in the reduction of $Cr^{+6}$ at temperatures below 150° C. It has now been discovered that these parasitic side reactions can be minimized by carrying out the reaction in the presence of $CO_2$ gas under pressure. Under these conditions, the rate of reduction is much higher, and the stoichiometry of the reduction set forth above is approached.

The preferred temperature range for the reduction of $Cr^{+6}$ by formaldehyde to yield an acid-soluble hydrated chromium oxide is from about 75° C. to about 150° C. The preferred temperature is 120° C. Carbon dioxide is introduced in at least sufficient quantity to tie up, as $Na_2CO_3$, all of the liberated NaOH. Preferably, an excess of $CO_2$ is employed. The preferred amount of $CO_2$ added is that which results in a 2:1 mixture of bicarbonate/carbonate. The chromium oxide product obtained by reduction with formaldehyde under the above conditions has a solids content of about 40% as opposed to that obtained at higher temperature, which is about 65% solids. Although formaldehyde is preferred for the reduction, formaldehyde precursors, or compounds which can yield formaldehyde under the above operating conditions can also be used. One such compound is paraformaldehyde. Another is 1,3,5 trioxane.

As mentioned previously, under certain operating conditions the reduction of $Cr^{+6}$ by methanol, formate ions, or formaldehyde is selective. Thermodynamically, reduction of $Cr^{+6}$ to $Cr^{+3}$ is favored over the reduction of any of $V^{+5}$, $Mo^{+6}$ or $W^{+6}$. It has now been discovered that there also exists a significant difference in the reduction rate of $Cr^{+6}$ on the one hand and the reduction rate of any of $V^{+5}$, $Mo^{+6}$ and $W^{+6}$ on the other. In the case of $V^{+5}$, the reduction process of the invention yields, initially at least, $V^{+4}$. If the concentration of $V^{+4}$ in the alkaline solution is less than about 3 g/l no compound of vanadium (such as $V_2O_4$) would be expected to precipitate during reduction of $Cr^{+6}$ at the preferred pH of 8 to 9 of the reaction medium.

To even further ensure freedom of the chromium oxide product from one or more of V, Mo, or W, it may be desirable to perform the reduction at substantially higher alkalinities than at the room temperature pH range provided by the 2:1 $NaHCO_3/Na_2CO_3$ buffer system. Those skilled in the art will find no difficulty in adjusting this alkalinity in conjunction with the concentration ratios of the elements mentioned above to that of $Cr^{+6}$. However, it should be recognized that the rate of reduction decreases as the alkalinity of the system is increased.

Reduction of sodium chromate and dichromate in aqueous solution by carbon monoxide gas proceeds as shown in equation 1. Three moles of carbon monoxide are required to reduce two moles of chromate to one mole of $Cr_2O_3$. The oxidation products of carbon monoxide are $NaHCO_3/Na_2CO_3$ in a molar ratio of 2 to 1, and thus there is a self-buffering effect at a given temperature. Thermodynamically, this reduction is highly favored at any pH in the range of interest, i.e. from pH of about 4 to 14. Kinetically, the reduction by CO gas proceeds at reasonably rapid rates only at elevated temperatures and pressures. The rate of reduction by carbon monoxide is adequately given by the kinetic expression:

$$-d[Cr^{+6}]/dt = k_1[Cr^{+6}]^{\frac{1}{2}}[CO]_l$$

where $[CO]_l$ is the liquid phase concentration of carbon monoxide. Substituting $[CO]_l$ from Henry's Law; i.e., $[CO]_l = k\, P_{CO}$ and putting $k_1 k = k_{CO}$:

$$-d[Cr^{+6}]/dt = k_{co}[Cr^{+6}]^{\frac{1}{2}}P_{CO}$$

The reaction between CO and $Cr^{+6}$ occurs in the aqueous phase. According to the above noted rate equation, higher carbon monoxide partial pressures promote more rapid reduction rates. The preferred temperature rate for the reduction by carbon monoxide is from about 175° C. to 320° C. The preferred temperature is 260° C. The preferred range for the carbon monoxide partial pressure is 15 to 800 psi with the preferred pressure being 200 psi and higher. The preferred pH is that of a $NaHCO_3/Na_2CO_3$ mixture in a 2:1 molar ratio, at which the reduction is self buffered.

Figure 6:
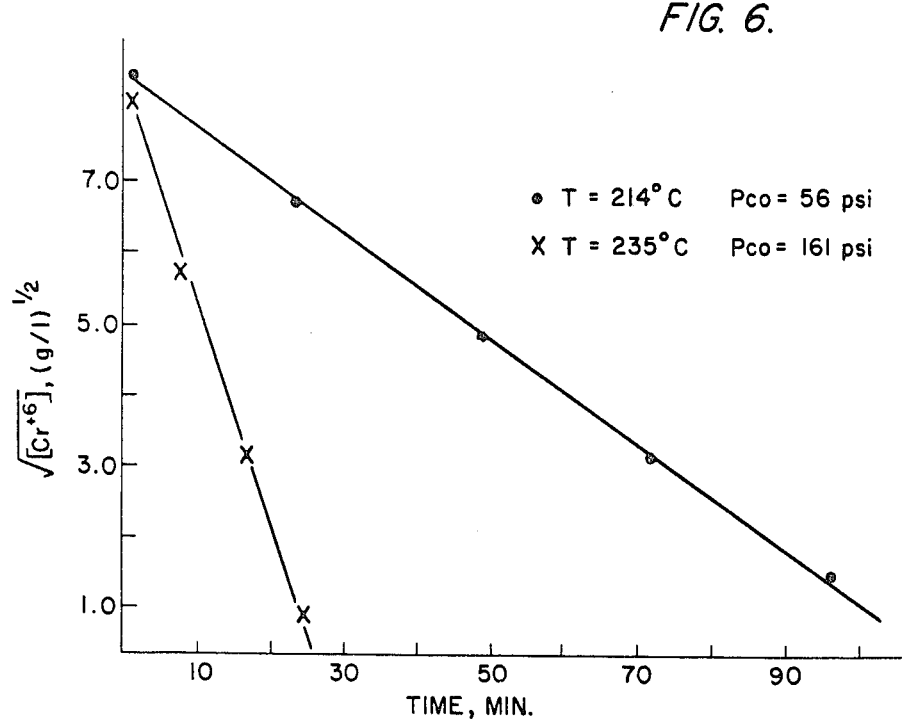
FIG. 6 is a graph disclosing the kinetics of $Cr^{+6}$ reduction by carbon monoxide gas at various temperatures and carbon monoxide partial pressures.
Figure 7:
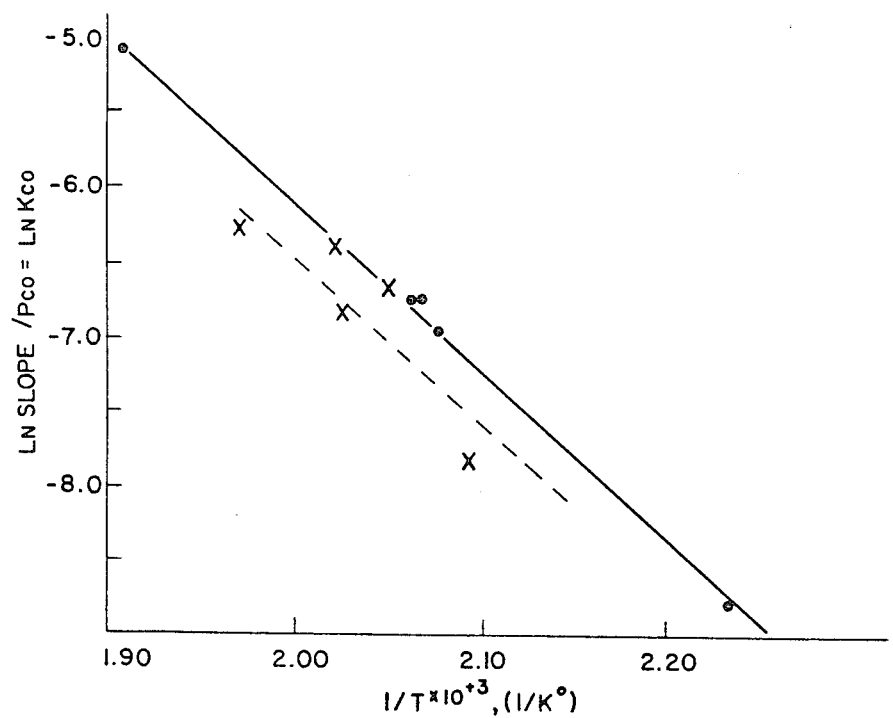
FIG. 7 is a graph showing the effect of temperature on the rate of reduction of $Cr^{+6}$ to $Cr^{+3}$ in alkaline solutions.

FIG. 6 discloses kinetic data for the reduction of $Cr^{+6}$ or $Cr^{+3}$ at two different temperatures and carbon monoxide partial pressures at the pH of the 2:1 $NaHCO_3/Na_2CO_3$ buffer. FIG. 7 discloses the effect of temperature on the rate of reduction of $Cr^{+6}$ to $Cr^{+3}$ in alkaline solutions. Two different parallel lines appear due to two different ways employed in measuring temperature in the autoclave, as described in the examples that follow.

As disclosed above with reference to reduction with the organic compounds, the reduction of $Cr^{+6}$ by carbon monoxide can be made selective for $Cr^{+6}$.

In accordance with another aspect of this invention, the reduction of $Cr^{+6}$ may be done in the presence of finely-divided carbon, such as carbon black. A hydrophilic form of carbon powder is preferred in order to obtain intimate mixing. However, a hydrophobic powder can also be used if a wetting agent, such as methanol, is added along with the carbon powder.

Sufficient carbon is added to the chromate/dichromate solution such that carbon can act thereafter as a reductant to reduce the solid chromium oxide to chromium metal and/or chromium carbides, as desired. The carbon monoxide produced as a by-product of the latter reduction may be recycled to the reducing zone where it acts as a reductant in consort with the methanol, carbon monoxide, ionized formate, or formaldehyde reductants. As known, chromium oxide can be converted to chromium metal by reduction with carbon at low pressure as follows:

$$Cr_2O_3 + 3C \rightarrow 2Cr° + 3CO$$

Various binders can be added to the mixture to facilitate briqueting. These briquets can be heated to 1275°–1400° C. in a refractory vacuum furnace.

In accordance with this embodiment of the invention, sodium chromates/dichromates in alkaline solution are ultimately reduced to chromium metal by carbon. This is accomplished in two steps as per the following equations:

$$4Na_2CrO_4 + 6CO + 2H_2O \rightarrow 2Cr_2O_3 + 4NaHCO_3 + 2Na_2CO_3$$

$$2Cr_2O_3 + 6C \rightarrow 4Cr° + 6CO$$

and the overall reaction:

$$4Na_2CrO_4 + 6C \rightarrow 4Cr° + 2Na_2CO_3 + 4NaHCO_3$$

Although direct reduction of chromate in alkaline solution by carbon is thermodynamically possible, laboratory experiments have shown that the rate of reduction is negligible under the operating conditions employed. However, in accordance with the foregoing process, $Cr^{+6}$ is reduced to chromium metal and/or carbides in two steps with high enough reaction rates to make the process economically attractive.

It is known that reduction of $Na_2CrO_4$ with carbon can be carried out in a solid state. Thus, U.S. Pat. No. 4,009,247 discloses a process in which chromium and/or chromium carbides are obtained by carburization of solid alkali metal chromates and/or dichromates with carbon at elevated temperatures. During the reaction, CO formed is removed by vacuum or by sweeping with argon. In contrast, the process disclosed above recovers chromium metal and/or carbides from alkaline $Cr^{+6}$ solutions by reduction in two steps. The ultimate reducing agent is carbon, carbon monoxide being an intermediate reducing agent. The process of the present invention does not require evaporation and crystallization of sodium dichromate. An intimate carbon/$Cr_2O_3$ mixture is formed during the first reduction step.

After reduction and separation of the chromium product, solid sodium carbonate/bicarbonate is recovered from the spent liquor. These solids are recycled and utilized in the calcination step. Where sodium formate forms part of the spent liquor, it can also be recycled to the calcination. The separation of solid carbonate/bicarbonate from the spent liquor can be achieved by cooling the saturated liquor, by evaporating and crystallizing the spent liquor or by saturating the liquor with $CO_2$ followed by cooling to collect a solid bicarbonate. The aqueous fraction of the separation step is recycled as fresh leach liquor in the process. It will typically comprise an aqueous solution containing the remainder of alkali metal values, chromates, carbonates, bicarbonates, hydroxides, etc., and may be recycled to the leaching step.

Vanadium Recovery

As a result of the foregoing treatment, as noted above, there is produced a mixed alkaline earth precipitate containing alkaline earth, typically calcium, salts of $MoO_4^=$, $VO_4^≡$, $WO_4^=$, and $CO_3^=$. The Mo/V/W ratios of the calcium cake will necessarily vary in relationship to the nature of the feed material originally calcined. If no vanadium were originally present, the cake will be vanadium-free and may thus be delivered directly to the Mo/W separation stages described hereinafter. If desired, the $CaCO_3$ fraction in the cake may be removed by treatment of the cake under mildly acid conditions (pH 2-7) prior to delivery to Mo/W recovery. The preferred acids for such a treatment are HCOOH or $CO_2/H_2O$. However, when vanadium is present it may be recovered in accordance with the procedure set forth below.

Broadly, the vanadium recovery process is based on the discovery that the calcium vanadate may be selectively dissolved from a mixed cake also containing $MoO_4^=$ and $WO_4^=$ ions by treatment with formic acid or $CO_2/H_2O$ in the pH range of 2-7. This discovery enables the design of several alternately useable vanadium recovery techniques.

In a first technique, the solid calcium cake is contacted with formic acid (or acetic). This results in the evolution of carbon dioxide, and in an aqueous phase rich in vanadium (as $V^{+5}$), $Ca^{++}$, and $HCOO^-$ (or $C_2H_3O_2^-$). After separation of the solid $CaMoO_4$, $CaWO_4$ mixture, vanadium values may be recovered from the solution by treatment with $Ca(OH)_2$, ammonia, or other base. As the pH rises, vanadium precipitates as a calcium vanadate or as an ammoniated vanadium product. $Ca(OH)_2$ is preferred because the dissolved $Ca(HCOO)_2$, produced as a byproduct may be recycled to the Mo/V/W precipitation step where its $Ca^{++}$ content is used to precipitate additional metal values and its formate (or acetate) ion content is subsequently consumed during $Cr^{+6}$ reduction. Alternatively, the vanadium values may be recovered directly from said solutions by solvent extraction processes based on the use of extractants such as amines. This technique has been found to be capable of removing 90% or more of the vanadium from the cake and results in a $V^{+5}$ leach solution typically containing 15 g/l $V^{+5}$ and 40 g/l $Ca^{+2}$. In addition, the $V^{+5}$ leach solution will contain small amounts of $Mo^{6+}$ and $W^{+6}$. The amount of $Mo^{+6}$ and $W^{6+}$ solubilized increases with decrease in the leach solution pH and/or decrease in the $Ca^{+2}$ content. Accordingly, in order to minimize $Mo^{6+}$ and $W^{6+}$ contamination of the $V^{+5}$ leach solution, it is preferred to leach the $Ca^{+2}$ cake by a two stage counter current process wherein the final pH of the $V^{+5}$ leach solution is in excess of 5 while the cake is given a final leach at a pH of less than 3. Under such leaching conditions typical $V^{+5}$ leach solutions will contain less than 0.3 g/l $Mo^{6+}$ and less than 0.04 g/l $W^{6+}$.

The extent of contamination of the $V^{+5}$ product will depend on the method adopted for its recovery. If a calcium vanadate product is the desired product, then the $Mo^{6+}$ and $W^{6+}$ contaminants present in the $V^{+5}$ leach solution will be found as contaminates in the vanadium product. However, a vanadium product substantially free of $Mo^{6+}$ and $W^{6+}$ impurities can be obtained by the process described below.

A second and preferred technique involves leaching vanadium with carbonated water at or close to room temperature. The $CO_2$ partial pressure must be superatmospheric in order to achieve efficient vanadium leaching. Little or no W or Mo reports in the aqueous phase. The solution containing vanadium is then heated to remove excess $CO_2$ and water, resulting in the precipitation of calcium vanadate. The water may be recycled to leach additional vanadium values. Although the solubility of calcium vanadate in the presence of superatmospheric $CO_2$ is only on the order of 2–8 g/l, and thus a rather large volume of water will be required, this causes no downstream dilution problems as the $CO_2$ and $H_2O$ are contained in a closed loop. Some CaO may be added to achieve a complete vanadium precipitation during heating, and consequently, the calcium vanadate product may contain small amounts of calcium carbonate. Any unprecipitate vanadium will report in the spent carbonated water, and will thus be reintroduced to the vanadium leaching step. Experiments indicated that about 90% of the vanadium in a calcium cake can be dissolved by carbonic acid, but the contamination by Mo and W to the vanadium product is much smaller than in the case of the formic acid treatment. Thus it is possible to use the $CO_2$-water vanadium leach to produce a pure vanadium product containing about 90% of the vanadium values in the calcium cake and then to treat the remaining cake with a relatively small volume of formic acid. The resulting leach solution, cotaining $Ca^{+2}$ values and the bulk of the residual $V^{+5}$ values, is then recycled, for example, to the V/W/Mo precipitation stage.

High purity $NH_4VO_3$ may also be obtained from the pregnant carbonated leach liquor or from the foregoing calcium vanadate product. In the former case, the leach liquor is first acidified with $H_2SO_4$ to a pH in the vicinity of 2.0 to precipitate $Ca^{++}$ as $CaSO_4$ and to liberate $CO_2$ gas. After separation of the precipitate, the dissolved vanadium values are extracted by a known solvent extraction technique such as, for example, using an amine as disclosed in the U.S. Bureau of Mines publication RI7932 (1974). Vanadium is then stripped from the organic with a $Na_2CO_3$ solution and precipitated with $NH_3$ and $(NH_4)_2CO_3$. The raffinate, i.e., the vanadium-barren leach liquor, containing $H_2SO_4$, may then be neutralized, e.g., with CaO to produce $CaSO_4$ which can either be separated out or recycled back to the vanadium leaching stage together with the $CO_2$ which was liberated during pH adjustments of the vanadium—containing carbonated water with $H_2SO_4$. This recycling step introduces $CaSO_4$ into the calcium cake. However, this salt is not dissolved during the vanadium leach, and will report in the molybdenum and tungsten rich cake delivered to Mo/W recovery stage, where it can readily be handled as disclosed below.

In the case of the calcium vanadate product, the solid is first leached with $H_2SO_4$ to solubilize $V^{+5}$ and the minor amounts of Mo and Cr contaminating the product and to reject $Ca^{++}$ as an insoluble $CaSO_4$ product. The solution is then subjected to the aforementioned solvent extraction process to produce an $NH_4VO_3$ product. The $Mo^{+6}$, $Cr^{+6}$, and any $W^{+6}$ which are coextracted into the organic phase are also stripped by the $Na_2CO_3$ stripping solution. However, since their ammonium compounds are highly soluble, they do not contaminate the vanadium product. Excessive build-up of contaminants may be prevented by recycling a small fraction of the $NH_3/(NH_4)_2 CO_3$ treated and filtered solution to the $Ca^{+2}$ cake precipitation stage.

Molybdenum and Tungsten Recovery

As a result of the foregoing treatment, there is produced a mixed solid containing alkaline earth, typically calcium, molybdate and tunstate. Depending on the vanadium recovery process employed, some $CaSO_4$ may also be included in the mixed solid. The object of this recovery stage is to obtain substantially pure molybdenum and tungsten containing products at high yields while producing no aqueous effluents and no solid byproducts contaminated with unacceptable quantities of molybdenum and tungsten. These objects are achieved by means of a novel step which partitions calcium from the mixed solids as a substantially Mo/W-free solid product consisting of $CaSO_4$ or $CaCO_3$ (environmentally acceptable land fill materials) and a concentrated solution rich in tungsten and molybdenum suited for subsequent treatment for the recovery of hydrated $WO_3$ product and an ammoniated, hydrated $MoO_3$ product.

The partition is based on the observation that $H_2O_2$ can complex with $MoO_4^=$ and $WO_4^=$ to prevent their coprecipitation with $CaSO_4$ or $CaCO_3$. It was found that Mo and W values in the mixed cake can be dissolved and separated from the Ca values if the cake is treated with an acidic solution (either $H_2SO_4$ or $CO_2/H_2O$) to which $H_2O_2$ has been added. Since the water insoluble $CaMoO_4$ and $CaWO_4$ in fact have finite low solubilities ($10^{-6}$ to $10^{-8}$ for $CaMoO_4$, $10^{-10}$ for $CaWO_4$), addition of the $H_2O_2$ complexing agent together with an anion which is not complexed and which forms a substantially insoluble calcium salt results in dissolution of the $WO_4^=$ and $MoO_4^=$ and leaves behind a substantially Mo/W-free $CaSO_4$ or $CaCO_3$ product. In a first embodiment, after repulping and $H_2O_2$ addition, $CO_2$ is introduced under pressure at or close to room temperature together with $NH_4HCO_3$. The resulting dissolution of Mo and W, with simultaneous rejection of calcium is the net result of the following multiple equilibria:

$$CaMoO_4 \rightleftharpoons Ca^{++} + MoO_4^= \qquad 20.$$

$$MoO_4^= + H_2O_2 \rightleftharpoons MoO_5^= + H_2O \qquad 21.$$

$$CaWO_4 \rightleftharpoons Ca^{++} + WO_4^= \qquad 22.$$

$$WO_4^= + H_2O_2 \rightleftharpoons WO_5^= + H_2O \qquad 23.$$

$$Ca^{++} + 2HCO_3^- \rightleftharpoons Ca(HCO_3)_2 \qquad 24.$$

$$Ca(HCO_3)_2 \rightleftharpoons CaCO_3 + H_2CO_3 \qquad 25.$$

$$CO_2 + H_2O \rightleftharpoons H^+ + HCO_3^- \qquad 26.$$

$$HCO_3^- \rightleftharpoons CO_3^= + H^+ \qquad 27.$$

Solid $CaCO_3$ may be removed by filtration; the $MoO_5^=$ and $WO_5^=$ remain in solution.

If $H_2SO_4$ is used in place of the $CO_3^=/HCO_3^-$, equations 24–27 are replaced by the following:

$$H_2SO_4 \rightleftharpoons H^+ + HSO_4^- \qquad 28.$$

$$HSO_4^- \rightleftharpoons H^+ + SO_4^= \qquad 29.$$

$$Ca^{++} + SO_4^= \rightleftharpoons CaSO_4 \qquad 30.$$

Again, the result is a calcium containing solid that can be removed by filtration while Mo and W remain in solution.

After separation of the solid, if $CaCO_3$ is the by-product, it may be recycled to precipitate additional $VO_4^=$, $MoO_4^=$, and/or $WO_4^=$ ions as a calcium cake from the leach liquor. The $CaSO_4$ byproduct may be conveniently used for land fill. It contains only trivial amounts of Mo and W. Advantageously, the resulting aqueous phase comprises a concentrated source of molybdenum and tungsten, typically containing 10–100 g/l combined Mo and W.

The leach solution may then be treated to partition and separately recover Mo and W values. U.S. Pat. No. 3,969,478, the disclosure of which is incorporated herein by reference, discloses one suitable technique. The '478 process involves adding $H_2O_2$ as a complexing agent to a mixed pregnant liquor containing tungsten and molybdenum, adding $HNO_3$ to the liquor to lower the pH to the range of 2.5–2.8 or $H_2SO_4$ to lower the pH to about 4.3 and then selectively extracting Mo with an organic solution containing a quaternary ammonium salt. Alternatively, the solution pH may be lowered to the range of 0.5–1.8, and thereafter treated with tri-n-butyl phosphate, tributyl phosphine oxide, or trioctyl amine to selectively extract the molybdenum and to leave behind a substantially Mo-free W containing solution.

Known techniques for the separation of Mo and W from acidic solutions, such as the one referred to above and others, perform well when one of these two metals is an impurity (low relative concentration) in a pregnant liquor of the second metal. However, it is quite difficult to separate and obtain substantially pure Mo and W products from feeds containing both these elements in comparable concentrations, e.g. Mo/W weight ratio from about 0.1:1 to about 10:1. Typically, the ratio of these two elements in naturally occurring ores lies outside the above range. On the other hand, materials treated by the process of this invention, e.g. superalloy scrap, tool steel grindings, etc. give typical weight ratios of about 3:1, of Mo/W.

For materials containing comparable levels of Mo and W, a second and preferred method of selectively recovering these values is based on the discovery that acidic ($H_2SO_4$) Mo and W containing leach liquors, stabilized by complexing with $H_2O_2$, can be heated in order to decompose the peroxide complexes and to precipitate a tungstic acid product. It was further discovered that a preferential precipitation of tungsten values can be carried out provided the acidity and total sulfate ions in solution are controlled within certain ranges as disclosed below. Thus, a substantially tungsten free molybdenum containing solution and a tungsten enriched precipitate are obtained. The solution containing molybdenum can be treated with activated carbon, as described in the U.S. Bureau Mines Report RI 7316 to remove residual tungsten so that the Mo to W weight ratio in solution is improved from about 70:1 to 100:1, to about 130:1 to 200:1. Molybdenum values can then be recovered from the substantially tungsten free, highly acidic solution by a partial neutralization with $NH_3$ to a pH in the range of 2.0 to 3.0, upon which a $4MoO_3.2NH_3.H_2O$ solid product is precipitated, as described by A. D. Kulkarni (Metallurgical Transactions, Volume 7B, March 1976, p. 115–118).

A further important discovery was that a selective leaching of Mo values from a mixed $CaMoO_4/CaWO_4$ cake can be achieved in the absence of hydrogen peroxide by again adjusting the acidity ($H_2SO_4$) and total sulfate ion content of the leach solution within the range specified below. As a consequence of this discovery, the following become possible:

(a) A molybdenum pregnant liquor substantially free of tungsten can be separated from a $CaMoO_4/CaWO_4$ mixed cake in a first selective leaching step in the absence of hydrogen peroxide. During this leaching $CaWO_4$ is converted to insoluble $H_2WO_4$ which stays behind with the resulting solid $CaSO_4$ by-product after separation of the Mo pregnant liquor. The solids also contain a small fraction of the original Mo values. Subsequently, all tungsten and remaining molybdenum values can be leached in the presence of $H_2O_2$ to give a much enriched tungsten pregnant liquor from which tungsten values are recovered selectively by decomposition of the peroxide complexes, as described above.

(b) The leaching of molybdenum and tungsten from the mixed calcium cake can be carried out simultaneously in the presence of $H_2O_2$, as described earlier, but, due to the aforementioned discovery it is now possible to decrease the consumption of $H_2O_2$ significantly. Thus, the minimum amount of hydrogen peroxide required now becomes that amount necessary to complex $W^{+6}$ only. The actual amount necessary depends also on the solution composition, i.e. sulfate ion concentration and acidity, Mo/W ratio in the calcium cake, and solution volume to calcuium cake weight ratio.

(c) A substantially pure tungsten product can be obtained. Tungstic acid, precipitated by heating the acidic pregnant liquor containing molybdenum and tungsten stabilized with $H_2O_2$, is contaminated with variable amounts of molybdenum. The W to Mo ratio in the precipitated product was found to depend on the initial W to Mo ratio and the absolute concentration of Mo and W in solution, acidity, and total sulfate ion in solution, as well as on temperature during precipitation. This contaminated tungstic acid can now be subjected to counter current selective leaching, in the absence of $H_2O_2$, for the removal of molybdenum values. The counter current leaching is done with highly acidic solutions, preferably hot, in at least two stages. The purity of the final tungstic acid product depends on the number of stages employed, W/Mo ratio in the initial precipitate, acidity, total sulfate ion concentration of the leaching solution, solution volume to precipitate weight ratio, and temperature. Typically, molybdenum contamination levels below about 1% can be obtained in three to four stages.

These discoveries enable the design of several alternately useable molybdenum and tungsten separation and recovery techniques.

(a) In a first, preferred, molybdenum and tungsten separation and recovery technique, the mixed calcium molybdate/tungstate cake, possibly contaminated with some $Cr^{+6}$ and $V^{+5}$, is mixed with a strongly acidic solution of high total sulfate content ($H_2SO_4$, $HSO_4^-$, $SO_4^{2+}$, $H^+$, $NH_4^+$, $Na^+$ ...) in a first leaching step at temperatures in the 35°–110° C. range, preferably at about 65° C., for about 5 to 30 minutes, preferably about 15 minutes. The leach solution has a total sulfate ion concentration in the range of about 3 to 10 M, preferably about 6.5 M. This sulfate content is in addition to the amount of sulfate (as sulfuric acid) necessary to convert all calcium values in the calcium cake to calcium sulfate. Typically, up to about 300 g of mixed calcium cake can be added to one liter of leach solution, after which it becomes increasingly difficult to stir. Calcium values are converted to $CaSO_4$ during this leaching operation.

After the first leaching operation, the slurry is cooled to a temperature below 50° C. and then subjected to counter-current leaching, typically in two stages, with an acidic ($H_2SO_4$) solution of high total sulfate content (3–10 M) which also contains hydrogen peroxide. The minimum amount of $H_2O_2$ is that necessary to complex all tungsten values contained in the slurry. Preferably, a 50% excess of the stoichiometric amount of $H_2O_2$ for complexing W is employed. The upper limit in $H_2O_2$ content is dictated only by economic considerations. The higher the total sulfate, the higher can be the Mo and W concentration in the pregnant liquor being treated. For a given total sulfate in the range mentioned, the higher the total sulfate ion to $NH_4^-$ mole ratio, the lower the excess (beyond the amount necessary for W) of $H_2O_2$ required for dissolution of all Mo and W values.

It is thus chemically advantageous to use only $H_2SO_4$ to bring up the total sulfate ion in solution to the preferred value. However, for a practical, preferred, operation of the process involving recycle streams from a subsequent ammonium tetramolybdate precipitation step, it is preferred to use leach solutions containing some ammonium ions. Thus, a typical pregnant liquor contains 70–100 g Mo plus W per liter, 1–2 moles $(NH_4)_2SO_4$ and about 5.5–4.5 moles $H_2SO_4$ per liter. If Mo values are to be recovered later on (after separation of W values) by a solvent extraction operation, then it is preferred to use only $H_2SO_4$ with no $NH_4HSO_4$ in solution.

The hydrated calcium sulfate tailings are washed with a strongly acidic sulfate solution containing $H_2O_2$ and then with water. Losses of Mo and W values to the trailings are insignificant.

To separate the tungsten values from the highly acidic/high sulfate ion content pregnant liquor containing soluble pertungstate, permolybdate, molybdate ions, etc., the solution is heated to boiling. Tungsten values precipitate as tungstic acid upon decomposition of the peroxide complexes. Depending on the acidity, total sulfate, sulfate to ammonium ion ratio, molybdenum concentration in solution, and temperature, the tungsten precipitate is contaminated with variable amounts of molybdenum. It was found that the contamination of the tungsten product can be decreased by a counter-current leaching, in 2 to 4 stages, of the product with highly acidic ($H_2SO_4$) solutions, similar in composition to those used for leaching the calcium cake as described above, (preferably 8–10 M $H_2SO_4$ at temperatures between 50°–110° C., preferably about 90° C.). Molybdenum values are selectively leached from the W product and recycled in the process while the solubility of W in such solutions is of the order of 25–100 ppm.

Molybdenum can be recovered from the substantially W free acidic solution by various techniques which include various solvent extractions. However, it is preferred to recover molybdenum by adding ammonia to the molybdenum solution to partially neutralize the excess sulfuric acid to a $(NH_4)_2SO_4/NH_4HSO_4$ mixture of final pH between 2.5 and 3.0. This neutralization is carried out at 65°–90° C. as described by Kulkarni in his work referred to earlier. Substantially all Mo values (typical equilibrium concentrations in solution of the order of 200 ppm) precipitate as $4MoO_3.2NH_3.H_2O$. If tungsten is present in the acidic Mo pregnant liquor, it will also precipitate and contaminate the final Mo product. The $Cr^{+3}$ and $V^{+4}$ impurities coprecipitate with the molybdenum values and thus their build-up in the recycled substantially Mo-free sulfate solution is prevented. To separate these impurities from the molybdenum values, the precipitate is treated with an ammoniacal solution, possibly containing molybdenum values (recycle solution from an ammonium paramolybdate recovery step). The Mo values are dissolved and separated, e.g., by filtration, from a solid residue containing mainly Cr and V values. The residue can be recycled in the process to separate and recover the Cr and V values. The purified ammoniacal molybdenum-containing solution is then stripped of some of its $NH_3$ content to precipitate a final, substantially pure ammonium paramolybdate product. The precipitation of ammonium paramolybdate from ammoniacal solutions is well known.

(b) The second technique for the separation and recovery of Mo and W values from a mixed calcium molybdate/tungstate cake takes advantage of the discovery mentioned earlier that molybdenum can be selectively leached out from such a cake in the absence of $H_2O_2$, provided the total sulfate ion and the acidity of the leach solution are high enough. Thus, the mixed Mo/W calcium cake is treated with a leach solution of total sulfate ion concentration in the 4–10 M range, preferably above 6 M, with an acidity level such that the molar ratio of ammonium ions, $NH_4^+$, to the total sulfate ($H_2SO_4$, $HSO_4^-$, $SO_4^{2-}$ etc.) is less than about 1:2, preferably about 1:4, and most preferably $NH_4^+$ free, in which case the total sulfate ion concentration is given by the amount of $H_2SO_4$ added to the aqueous solution. All the above sulfate ion contents are in addition to the stoichiometric amount of $H_2SO_4$ added to convert all calcium values in the mixed Mo/W-cake to calcium sulfate.

Treatment of the calcium cake with the above solutions at temperatures in the range from about 40° C. to about 125° C., preferably at about 75° C., results in the solubilization of molybdenum values, typically up to about 65–95 gMo/l, and conversion of the tungsten values to substantially insoluble $H_2WO_4$ (equilibrium value of W in solution is in the 200 ppm to about 2500 ppm range, depending on acicity, total sulfate, Mo concentration and temperature). The tungstic acid precipitate is mixed with solid calcium sulfate, formed during leaching, and contaminated with variable amounts of molybdenum values. A solid/liquid separation following the above leaching yields:

(1) A Mo pregnant liquor with minor tungstun contamination, which may also contain some Cr and V impurities if these were originally present in the mixed calcium cake. Further purification and recovery of Mo values from this liquor can be achieved, as described earlier by the preferred technique or by conventional solvent extractions.

(2) A solid phase containing tungstic acid mixed with hydrated calcium sulfate and contaminated with variable amounts of molybdenum values. Further selective leaching of molybdenum values in a second, third stage, etc. is possible. However, it is preferred to treat these tungsten rich solids with an acidic ($H_2SO_4$) leach solution containing sufficient amount of hydrogen peroxide to solubilize all tungsten and remaining molybdenum values and thus separate them from the $CaSO_4$ tailings. The suitable conditions and leach solution compositions, as well as the method for preferentially precipitating tungsten values with subsequent product purity improvement by counter current washing, are the same as those described earlier for the preferred separation technique. Molybdenum values remaining in solution can be conveniently recycled.

The System

Referring to the drawing, an overall processing system showing some preferred embodiments of the process of the invention utilizing the foregoing discoveries is schematically illustrated. As mentioned previously, the nature of the feed and consequently the content of the leach liquor may vary. The discussion which follows assumes that a feed material containing Cr, W, V, Mo, Fe, Cu, Mn, Ni and Co metal values, silicates and aluminates, and trace quantities of phosphorus is used. However, it will be apparent that one or more of these may not be present, and in that case the required processing steps may be eliminated.

Referring to FIG. 1, feed material comprising scrap material such as grindings, turnings, dusts, and fines from oxidation resistant superalloys, refractory metal alloys, tool steels hardfacing grindings, and similar alloys, as well as spent catalysts, optionally mixed with chromite and/or wolframite ores is subjected at 10, if necessary, to a particle size reduction to the dimensions disclosed above. The resulting fine particulate feed material is then, again optionally, admixed in mixer 12 with recycled $Na_2CO_3/NaHCO_3$ (line 52) and a diluent which may be required (depending on the feed composition) to promote acceptable flow property of the mix during calcination. The leach residue subsequently partitioned from the calcined feed can be used for this purpose and thus may be delivered through line 13. Small additional amounts of fresh $Na_2CO_3$ may also be added in mixer 12, as required. Next, the feed is pelletized in pelletizer 14 and delivered to the calciner 16.

The calcination is conducted in the presence of an oxygen containing gas, suitably air, at a temperature preferably in the range of 950° C. to 1150° C. As a result of the calcination, chromium, vanadium, molybdenum, and tungsten values are converted to water soluble anions, a portion of the phosphorus content (if any) of the feed is converted to water soluble sodium phosphates, and some water soluble aluminates and silicates may be produced. The iron, nickel, cobalt, copper, and manganese values are converted to insoluble oxides. A substantial fraction of the silicon and aluminum values are also insoluble. The calcined feed is delivered through line 18 to leaching stage 20 where it is intimately contacted with water. A conventional liquid-solid separation conducted at 22 results in an insoluble leach residue containing the iron, nickel, cobalt, copper and/or manganese values as well as insoluble silicates and aluminates from the aqueous phase. As mentioned above, a portion of the leach residue may be delivered to mixer 12 as a diluent; the remainder is delivered to conventional, preferably hydrometallurgical stages to recover valuable nickel, cobalt, and copper.

The aqueous phase is delivered to silicate and aluminate removal stage 24 wherein its pH is adjusted downward, preferably with carbon dioxide, to a level where the soluble silicate and aluminate content of the leach liquor is reduced to acceptable values by precipitation.

The precipitated silicates and aluminates are then removed in liquid-solid separation stage 26.

The now aluminate and silicate-free leach liquor next is delivered through line 28 to phosphate removal stage 30. In stage 30, magnesium ion and ammonia are added to induce precipitation of magnesium ammonium phosphate, or alternatively, the pH is lowered by the addition of carbon dioxide or formic acid, and magnesium ion is added to precipitate magnesium hydrogen phosphate. Separation in liquid-solid separation stage 32 results in a substantially phosphate-free leach liquor which is delivered directly to stage 34.

In stage 34, carbon dioxide gas is sparged into the leach liquor at room temperature to induce the precipitation of sodium bicarbonate and to convert a portion of the chromate content of the liquor to dichromate. Separation of the sodium bicarbonate in liquid-solid separation stage 36 produces a solid sodium bicarbonate product for recycle to the mixer 12 and a leach liquor with a substantially reduced sodium content and increased dichromate content which may be delivered to molybdenum, vanadium, and tungsten partition stage 38. Here, calcium oxide (or hydroxide) is added to the leach liquor together with formic acid. In addition, Ca(HCOO)$_2$ solutions produced in downstream unit operations and contaminated with Mo and/or W and/or V can be utilized in place of or in addition to formic acid and CaO. Optionally, quantities of chromate or dichromate salt may also be added to enrich the chromium content of the liquor. The addition of Ca$^{++}$ results in the selective precipitation of calcium vanadate, calcium molybdate, and calcium tungstate mixed with some calcium carbonate. As disclosed above, use of the carbon dioxide pretreatment in stage 34 significantly reduces and can even eliminate the formic acid consumption otherwise required for this step.

The solid and liquid phases are thereafter separated at stage 40. The mixed calcium cake is delivered to downstream molybdenum, tungsten, and vanadium recovery stages; the aqueous phase containing sodium salts of chromate, formate, small quantities of molybdate, as well as trace quantities of vanadate and tungstate is then delivered via line 41 to chromium reduction stage 42.

As discussed previously, formic acid consumption in molybdenum, vanadium, and tungsten partition stage 38 decreases as the dichromate content of the leach liquor increases, and accordingly chromium rich solutions are preferred. One method of upgrading the chromium content of the leach liquor is to take a bleed stream 44(a) from stream 41 for recycle to the leaching stage 20. Another is to include an enriching quantity of chromite ore in the feed.

The chromium reduction is effected with one or a mixture of carbon monoxide, formate, formaldehyde, or methanol. When employing the organic reducing agents, the reaction is preferably conducted under a superatmospheric carbon dioxide pressure. The reduction of the Cr$^{+6}$ content of the leach liquor is preferably not taken to completion, so that a substantially molybdenum, vanadium, and tungsten-free hydrated chromium product is produced. Accordingly, the liquid-solid separation conducted at 44 subsequent to the chromium reduction results in a substantially pure Cr$_2$O$_3$.XH$_2$O solid product and a spent leach liquor containing sodium, carbonate and bicarbonate ions, and residual quantities of molybdate, vanadate, and tungstate ions, all of which are carried over in the aqueous phase from separation stage 40, as well as residual chromium values remaining after the reduction. Salts in the leach liquor may then be crystallized in stage 46. A liquid-solid separation in stage 48 provides water, possibly containing some salts, for delivery through line 50 to leaching stage 20 and salts comprising mostly sodium carbonate and bicarbonate, but also trace quantities of sodium vanadate, tungstate, molybdate and chromate which may be recycled to the mixer 12.

From the foregoing it may be seen that essentially the only by-products produced in the chromium recovery loop are the valuable leach residue, solid silicates and aluminates, a magnesium hydrogen phosphate or magnesium ammonium phosphate precipitate, and carbon dioxide gas which escapes during the calcination. The only reagents consumed are carbon dioxide, calcium oxide, formic acid, carbon monoxide or one or more of the low molecular weight organic reducing agents, and small quantities of magnesium oxide and possibly ammonia. Furthermore, the process does not involve any energy intensive steps such as are required in melting operations. Lastly, various different feed materials can be used in the process, including both alloys and ores, which have different ratios of the metals of interest and various impurities.

Figure 2:
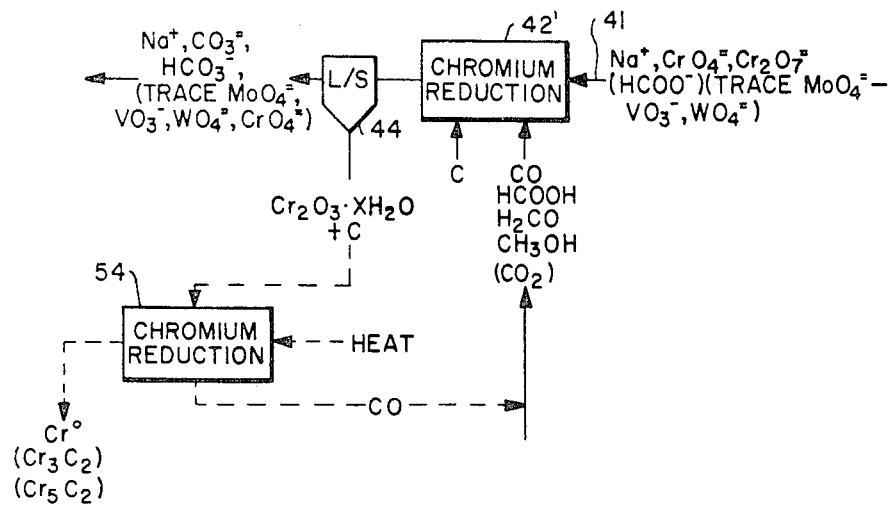
FIG. 2 is a schematic diagram illustrating a chromium reduction stage useful in the system of FIG. 1 wherein particulate carbon is included in the chromium product.

Referring to FIG. 2, an alternative embodiment for the reduction stage of the process of FIG. 1 is shown. In this embodiment, finely divided carbon is added to the chromium reduction stage 42' together with one or more of the chromium reducing agents. This results in a solid chromium product comprising an intimate admixture of hydrated Cr$_2$O$_3$ plus carbon particles. On separation of the phases in liquid-solid separation stage 44, the solid product may optionally be delivered, after dehydration, to a second chromium reduction stage 54, where the chromic oxide-carbon mixture is heated to reduce the Cr$^{+3}$ to chromium metal or chromium carbides. The carbon monoxide by-product of this reduction may be recycled to the first chromium reduction stage 42'.

Figure 3:
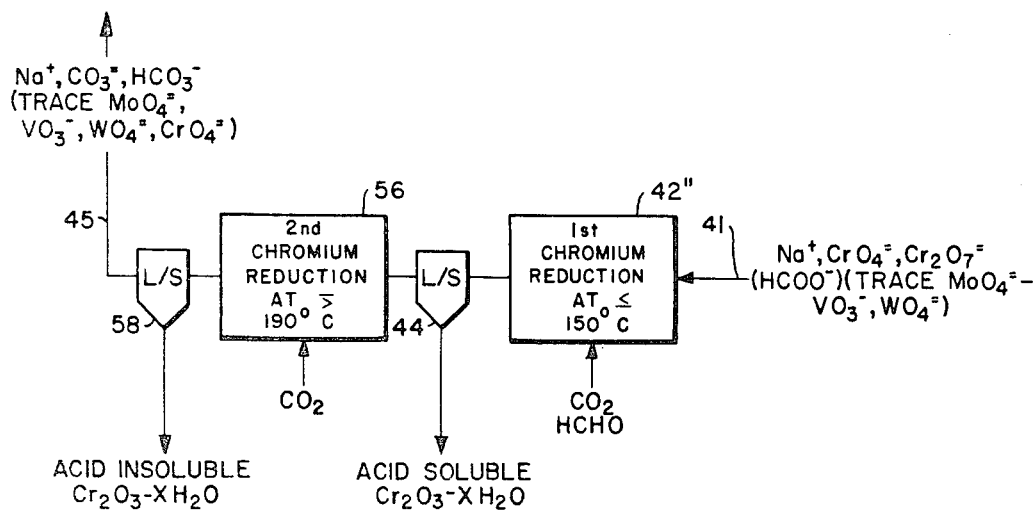
FIG. 3 is a schematic diagram illustrating a chromium reduction technique useful in the system of FIG. 1 wherein an acid soluble chromium product and an acid insoluble chromium product are successively produced.

Referring to FIG. 3, still another alternative embodiment for the Cr$^{+6}$ reduction of the system of FIG. 1 is shown. After separation of the molybdenum, vanadium, and tungsten in stage 38, the chromium-pregnant leach liquor is delivered to a first chromium reduction stage 42" wherein formaldehyde is used as a reductant at a temperature less than or equal to 150° C. under a superatmospheric carbon dioxide pressure. Separation of the solids from the liquid in stage 44 results in an acid soluble solid hydrated chromium product and formate ions in solution. The aqueous phase is then delivered to a second chromium reduction stage 56 wherein additional quantities of chromium are reduced by the formate ions at temperatures equal to or greater than 190° C. A subsequent liquid-solid separation at stage 58 produces an acid-insoluble chromium oxide product. The now substantially chromium-barren spent liquor is then delivered through line 45 for subsequent treatment and recycle.

Figure 8:
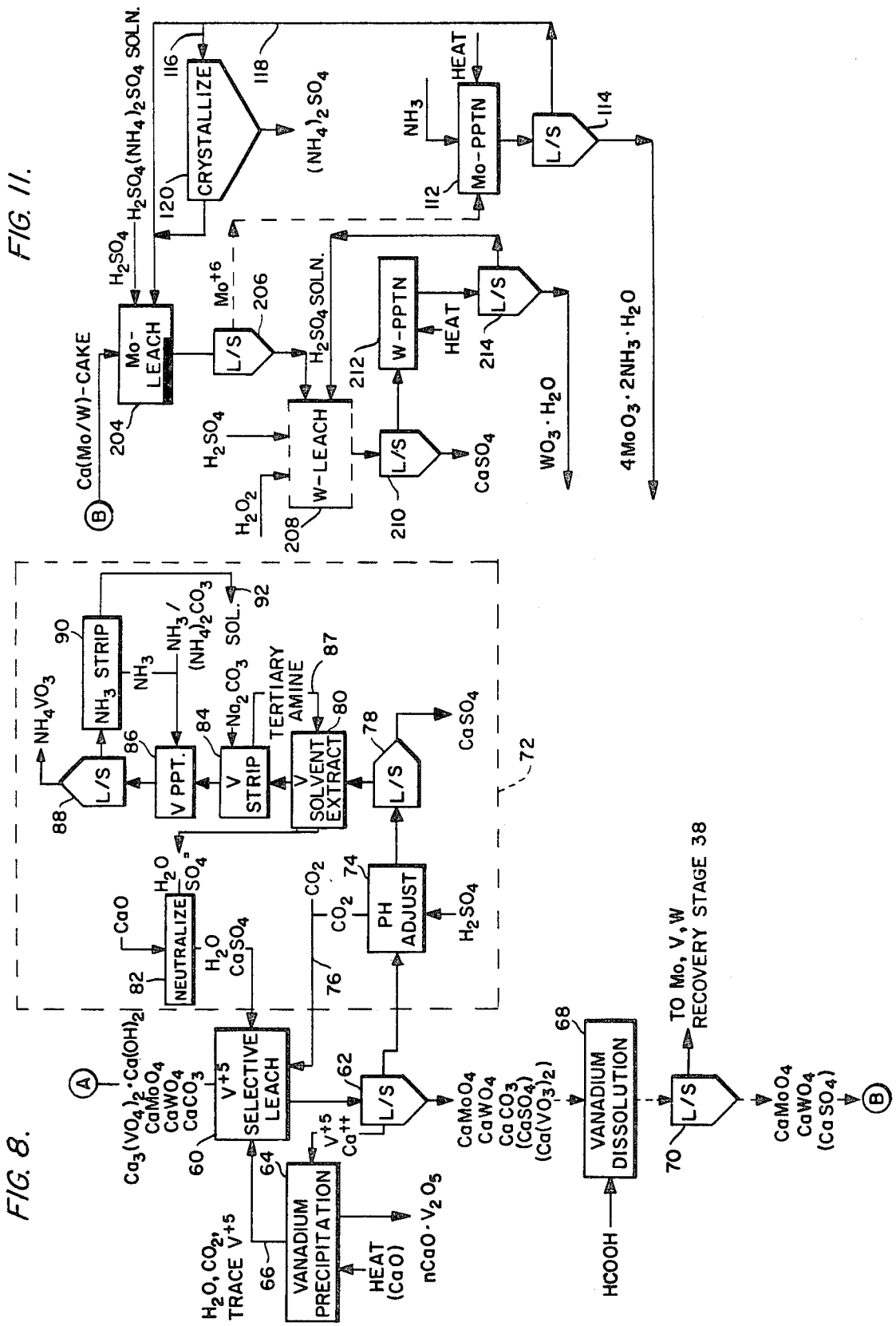
FIG. 8 is a schematic diagram illustrating a vanadium partition from the calcium cake rejected (at A) from the system of FIG. 1 and alternative methods of recovering a vanadium product.
Figure 9:
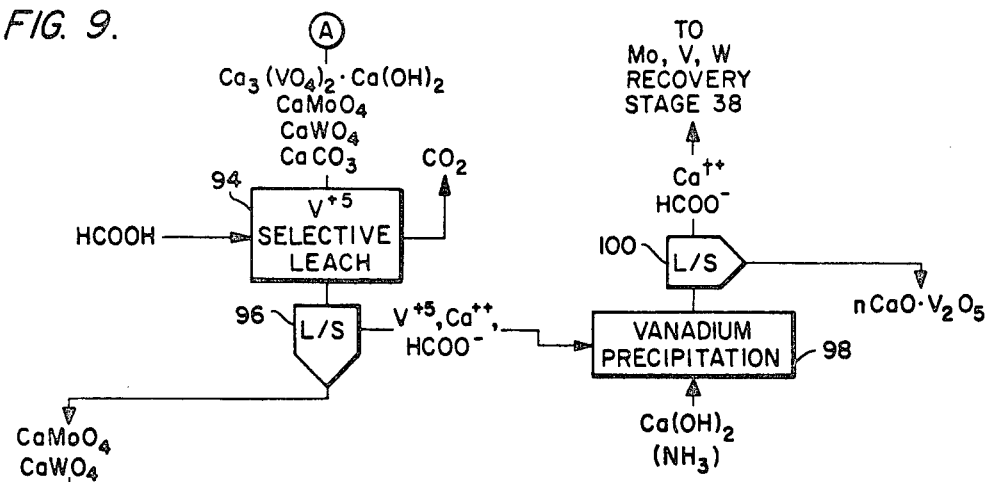
FIG. 9 is a schematic diagram illustrating an alternative method of partitioning and recovering vanadium from the calcium cake rejected (at A) from the system of FIG. 1.

FIGS. 8 and 9 illustrate various vanadium recovery systems alternately useable in connection with the foregoing chromium recovery loop. Referring to FIG. 8, the mixed calcium cake containing vanadate, molybdate, tungstate and some carbonate from liquid-solid separation stage 40 (FIG. 1) is delivered to stage 60 where the cake is repulped with water and treated at ambient temperatures with pressurized carbon dioxide to selectively redissolve the calcium vanadate. The two phase mixture is then delivered to liquid-solid separation stage 62 which produces a substantially molybdenum and tungsten-free solution containing calcium and vanadium ions. The solution is boiled in vanadium precipitation stage 64 to produce a substantially pure $nCaO.V_2O_5$ solid product. Small quantities of calcium oxide may be required to promote high vanadium product yields. The water, carbon dioxide, and possibly trace vanadium values remaining after separation of the vanadium product may then be recycled to the calcium vanadate selective leach stage 60.

As noted above, while carbonated water is quite selective in dissolving vanadium to the substantial exclusion of molybdenum and tungsten, generally on the order of only 85 percent of the vanadium values are solubilized, and the remainder reports in the calcium cake separated at stage 62. The treatment of the calcium cake with formic acid, on the other hand, results in the dissolution of upwards of 90% of the vanadium value, but vanadium recovered in this way is contaminated with larger quantities of molybdenum and tungsten. Accordngly, to obtain vanadium yields in excess of the 85 percent recovered via leach stage 60, the calcium cake separated at 62 can be treated with formic acid in optional vanadium dissolution stage 68. The subsequent liquid-solid separation in separator 70 results in an aqueous phase containing the bulk of the remaining vanadium values, $Ca^{++}$ values, formate ions, and small quantities of molybdenum and tungsten. This aqueous phase may accordingly be delivered to the molybdenum, vanadium, and tungsten partition stage 38 (FIG. 1). The now substantially vanadium-free calcium cake resulting from the separation conducted at stage 70 may be delivered to molybdenum and tungsten recovery.

An alternative method of recovering vanadium from the pregnant liquor separator in stage 62 is shown in FIG. 8 at 72. In this embodiment, the liquor containing calcium and vanadate ions is first treated with $H_2SO_4$ to lower it pH to the vicinity of 2.0 in reactor 74. This results in the evolution of carbon dioxide which may be recycled to the selective vanadium leach stage 60 via line 76. A liquid-solid separation at 78 results in a substantially vanadium-free calcium sulfate solid suitable for use as a landfill. The aqueous phase is delivered to stage 80 where it is connected with an organic extractant capable of extracting vanadium, such as a secondary or tertiary amine. The substantially vanadium-free aqueous phase is then neutralized at stage 82 with calcium oxide, and the resulting water and calcium sulfate, mixed with residual vanadium values, is recycled to the calcium vanadate selective leach stage 60. The vanadium-pregnant organic phase is stripped with aqueous sodium carbonate solution at 84, with recycle of the organic extractant via line 87. Upon addition of ammonia and ammonium carbonate, ammonium vanadate precipitates in stage 86 and is separated at 88. Excess ammonia is then boiled off from the spent liquor at 90 for reuse in the vanadium precipitation, and the aqueous sodium carbonate solution is recycled to stripping stage 84 via line 92.

Referring to FIG. 9, still another method of selectively leaching calcium vanadate from the mixed calcium cake is illustrated. The selective calcium vanadate leach is conducted in stage 94 with the aid of formic acid. Carbon dioxide is liberated as calcium carbonate dissolves. The remaining solids, separated in liquid-solid separation stage 96, comprise a substantially vanadium-free mixture of calcium molybdate and calcium tungstate. The solubilized vanadium and calcium ions, now present together with formate anions in the aqueous phase, is delivered to vanadium precipitation stage 98 where either calcium hydroxide or ammonia is added to the leach liquor. This results in either a $CaO.V_2O_5$ precipitate or an ammoniated vanadium product, separated at stage 100, and a calcium formate aqueous solution which may be delivered to the molbybdenum, vanadium, and tungsten recovery stage 38 (FIG. 1) where the calcium ion content is used to precipitate additional refractory metal values and the formate ion content is used to reduce chromium.

Figure 10:
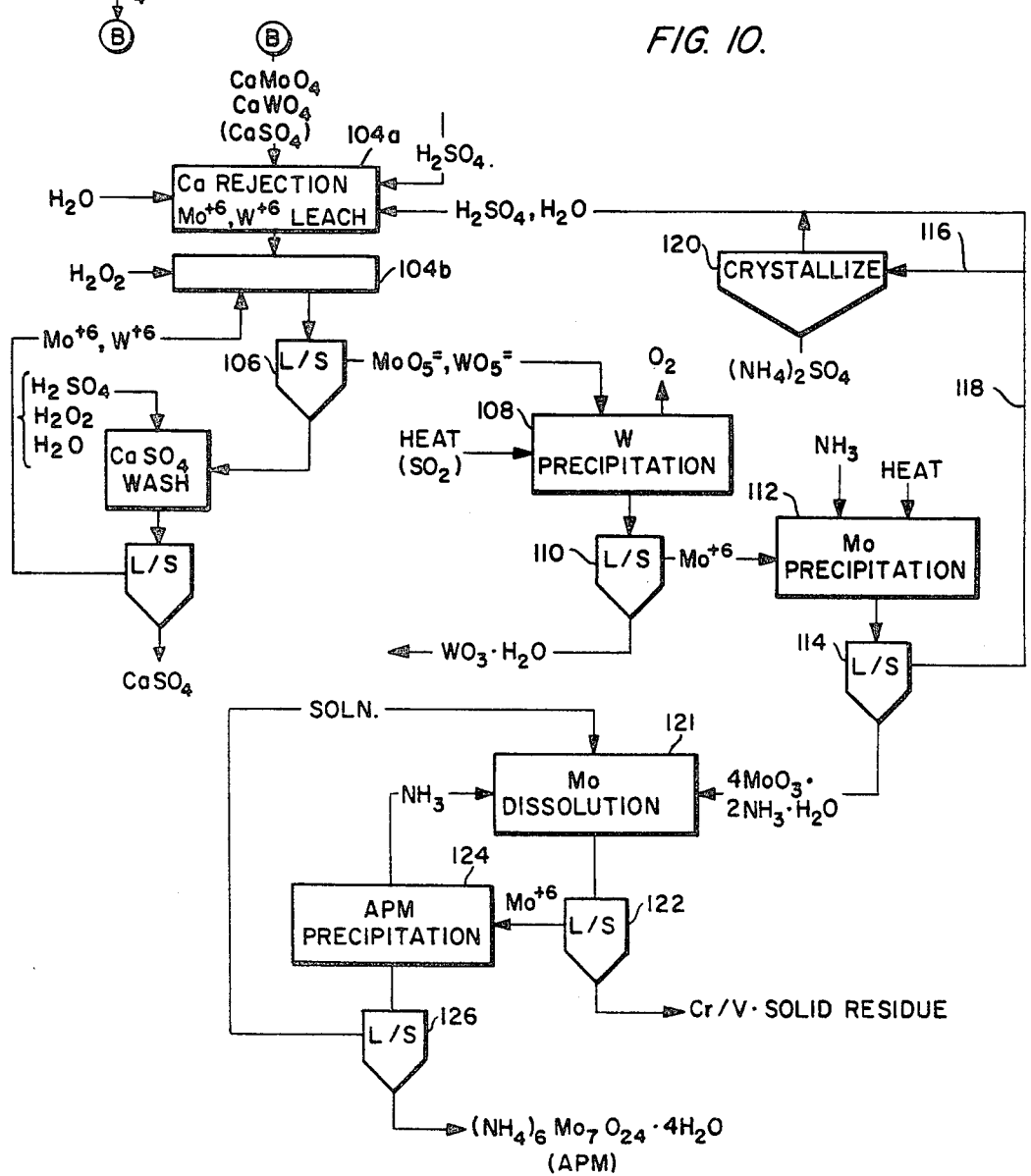
FIG. 10 is an schematic diagram illustrating a method of recovering Mo and W from the calcium cake rejected from the vanadium recovery stage (at B) with simultaneous rejection of calcium.

FIGS. 10 and 11 disclose methods for recovering tungsten product and molybdenum product from the calcium cake rejected in the vanadium recovery methods disclosed above. A mixed calcium cake, possibly containing calcium sulfate and some residual chromate and vanadate as well as the molybdates and tungstates, is repulped and leached with an aqueous solution containing $H_2SO_4$, $NH_4HSO_4$, and $H_2O_2$ at stages 104a and 104b. Stages 104a and 104b represent the first leaching, at temperatures above about 60° C., and the second one, at temperatures below about 50° C., respectively. Hydrogen peroxide is added to stage 104b. Sufficient sulfuric acid is added thereto, in excess of that required to convert all calcium values in the cake to $CaSO_4$, to raise the total sulfate ion concentration of the leach solution to about 6.0-6.5 M and bring the total sulfate to ammonium mole ratio to about 2:1 to 4:1. Hydrogen peroxide is added in stage 104b so that the mole ratio of $H_2O_2$ to total W values is at least 1.5:1. Hydrogen peroxide complexes tungsten values and prevents precipitation of tungstic acid at this stage. Excess of $H_2O_2$ also complexes part of the molybdenum values in solution. As a result of the leach, tungsten and molybdenum values remain in solution whereas calcium is rejected as calcium sulfate. The solid calcium sulfate waste is subjected to a counter current wash with an acidic, $H_2SO_4$, solution containing also $H_2O_2$ in order to remove entrained Mo and W values. The wash solutions are recycled into leaching stage 104b. As a result of a separation of the phases at stage 106, there is produced a molybdenum and tungsten containing solution of high concentration having a pH less than about 1 and a total sulfate ion concentration greater than about 4 M. The solution is delivered to stage 108 wherein heat and/or sulfur dioxide gas is used to decompass the peroxide complexes and to precipitate the tungsten value as $WO_3.H_2O$. $SO_2$ reduces $Cr^{+6}$ and $V^{+5}$ impurities to $Cr^{+3}$ and $V^{+4}$ which are soluble at low pH and remain in solution. The solids, separated at stage 110, may be subjected to a counter current wash (not shown) with a $H_2SO_4$ solution to remove selectively residual Mo values. After separation of the solid tungsten product at stage 110, the molybdenum containing leach liquor is treated with ammonia at stage 112 to raise its pH to the 2.0-3.0 range. The application of heat produces an ammoniated, hydrated, solid molybdenum oxide product and coprecipitated Cr and V impurities which are separated at stage 114. The spend acidic leach liquor, containing residual molybdenum and tungsten values, is then recycled to calcium rejection stage 104a via line 118. To prevent buildup of ammonium ions in the recovery loop, it is preferred to take a bleed stream 116 from the leach liquor recovery line 118 and to precipitate ammonium sulfate from the stream in crystallizer 120. This step is also useful in controlling the acidity and total sulfate concentration to within the preferred range mentioned previously.

The solid molybdenum product separated at stage 114 is treated in stage 121 with an ammoniacal solution, which may also contain recycled Mo values, to dissolve Mo values and to leave behind a solid residue containing chromium and vanadium values. This solid, separated at stage 122, can be recycled in the process, e.g., to mixer 12 in FIG. 1. The ammoniacal Mo containing solution is stripped of some of its $NH_3$ content at stage 124 in order to precipitate ammonium paramolybdate (APM) which is separated as a final product in stage 126. The ammonia stripped in stage 124 and the solution removed from stage 126 can be recycled to stage 121.

As an alternative to the system illustrated in FIG. 10, carbonic acid mixed with some sodium bicarbonate can be used in place of the sulfuric acid in the calcium rejection step 104a. This results in the precipitation of calcium carbonate in place of the calcium sulfate. The $CaCO_3$ can be used in the molybdenum, vanadium, and tungsten partitions stage 38 (FIG. 1). Where carbonic acid is used in place of sulfuric, the leach liquor separated at stage 106 contains $MoO_5^=$, $WO_5^=$, $H_2O_2$, carbonic acid, and some $NH_4HCO_3$. Mo and W can be separated and recovered from such solutions by first acidifying with $H_2SO_4$ and then employing solvent extraction techniques such as the one disclosed in U.S. Pat. No. 3,969,478 and others.

Molybdenum values can be alternatively recovered from the substantially tungsten-free solution separated at stage 110 by a variety of conventional solvent extraction techniques whose role would actually be to recover Mo values (from a tungsten-free solution) as a useful Mo-product, e.g., ammonium paramolybdate, and to produce an acidic raffinate suitable for recycle to the leaching step 104.

Referring to FIG. 11, a second method of recovering molybdenum and tungsten is disclosed. As with the system in FIG. 10, the calcium cake is leached (stage 204) with a strongly acidic aqueous solution of high total sulfate ion concentration. Additional $H_2SO_4$ is added to convert all calcium values to $CaSO_4$. However, unlike the leaching step in FIG. 10, there is no hydrogen peroxide present in step 204. Thus, molybdenum values are selectively solubilized and the resulting solution, which is substantially tungsten free, is separated in stage 206 from the solids which contain $H_2WO_4$ mixed with $CaSO_4$ waste. Molybdenum values are recovered from the Mo-containing solution as described with reference to FIG. 10, from step 112 onward.

The solids separated at step 206 are leached at stage 208 with an acidic solution of high total sulfate content to which sufficient hydrogen peroxide is added to complex all tungsten values. Following this leaching, solid calcium sulfate waste, substantially free of any Mo and/or W values after washing, is separated at stage 210 from the leach solution containing the tungsten values and some residual molybdenum values. To recover the W values, this solution is heated at step 212 to decompose the peroxycomplexes and thus precipitate a $H_2WO_4$ product, leaving most of the residual Mo values in solution. The solid W product is separated from solution at stage 214 and repulped/washed in several counter-current stages (not shown) to improve its purity by selectively leaching out Mo values coprecipitated with $H_2WO_4$ at step 212. The solution separated at stage 214 is recycled in the process, e.g. partly to step 208, 204 and/or 112 (FIG. 10), as needed. Similarly to the system in FIG. 10, molybdenum values can be alternatively recovered by various conventional solvent exraction techniques from the substantially W free pregnant liquor separated at step 206.

The invention will be further understood from the following non-limiting examples.

EXAMPLE 1

Three samples of superalloy grindings (alloys A, B and C) and a sample of superalloy turnings (alloy A) were obtained. Nominal composition of these alloys are set forth below.

| | Oxidation Resistant Superalloys | | |
|---|---|---|---|
| | Alloy A | Alloy B | Alloy C |
| Ni | 55.0 | 47.0 | 22.0 |
| Co | 2.5 | 1.5 | 39.0 |
| Fe | 5.5 | 19.0 | 1.5 |
| Cr | 15.5 | 22.0 | 22.0 |
| Mo | 16.0 | 9.0 | 0.0 |
| W | 3.8 | 1.0 | 14.5 |
| Other | 1.0 | 1.0 | 1.0 |

A screen analysis indicated that the grindings had median particle sizes by weight ranging from about 100 to 140 microns. Grindings were classified by screening to give samples having average sizes by weight of 75 microns, 90 microns, 160 microns and 400 microns. The screened samples were each mixed with an equal weight of sodium carbonate and then calcined in air at 1100° C. for four hours. Thereafter, the samples were leached with water. Each leach residue was remixed with sodium carbonate and subjected to a second calcination and leach process. Analysis of the leach solutions showed that the chromium, molybdenum, and tungsten contents of the first leach solution was at least one order of magnitude larger than that of the second solution. Further, emission spectra data indicated that the second leach residue had little or no molybedenum, tungsten or chromium. These data indicate that essentially complete conversion of the metals of interest of their corresponding water soluble sodium salts was obtained after two calcinations. The percentage of the metals in the first leach solution was then determined. The results obtained are summarized in the table below.

| Percent Metal Leached After A Single Calcination At 1100° C. For Four Hours | | | | | | | | |
|---|---|---|---|---|---|---|---|---|
| NOMINAL | ALLOY A | | ALLOY B | | | ALLOY C | | |
| SIZE Microns | Mo (%) | Cr (%) | Mo (%) | W (%) | Cr (%) | Mo (%) | W (%) | Cr (%) |
| 75 | 99.2 | 99.8 | 99.8 | 99.1 | 99.7 | 93.3 | 98.4 | 98.8 |
| 90 | 98.6 | 99.6 | — | — | — | 71.8 | 94.1 | 94.0 |
| 160 | 98.1 | 99.3 | — | — | — | 89.3 | 99.5 | 98.7 |
| 400 | 96.3 | 98.3 | 99.8 | 98.7 | 99.5 | 91.8 | 99.9 | 96.7 |

The above data indicate that grindings with nominal sizes up to about 400-500 microns can be calcined with $Na_2CO_3$ and leached in water to solubilize a major portion (generally in excess of 90% of their molybdenum, tungsten, and chromium values. Moreover, the percent metal solubilized appears in two cases to decrease only slightly with increase in particle size. In the third case, (alloy C) it is believed that the effect of particle size was masked by experimental error.

EXAMPLE 2

In the case of mixtures of shredded turnings and grindings, much better recoveries are obtained as compared with grinding-free turnings. Mixtures of shredded turnings (570×800×635 microns) and grindings of alloy A were mixed with $Na_2CO_3$, calcined in air at 1100° C., and subsequently leached. The relative amounts of shreddings and grindings and the percent metal recoveries are shown in the table below:

| Percent Metal Solubilized Using Mixtures of Shredded Turnings and Grindings (Alloy A) | | | |
|---|---|---|---|
| Weight Ratio of | Recent Metal Leached | | |
| Shred. Turn.:Grindings | M | W | Cr |
| 1:1 | 96 | 95 | 85 |
| 1:2 | 98 | 98 | 93 |
| 1:5 | 99 | 95 | 95 |

The above data indicate that the mixture of shredded turnings and grindings can be successfully calcined. The suitability of mixtures of small and larger scrap is attributed to the oxidation of grindings at 1100° C., especially in the presence of $Na_2CO_3$, being rapid and highly exothermic. Presumably, the fine particle size fraction retains the $Na_2CO_3$ values, and the combination of the alkali metal salt and the high temperature is sufficient to allow oxidation of the shredded turnings. However, scrap having a particle size significantly in excess of the turnings set forth above must be reduced in size in order to be used.

EXAMPLE 3

Tool steel scrap containing 3.7% chromium, 3.6% molybdenum, 2.1% tungsten, 1.5% vanadium, about 4% silicon, and about 6% aluminum were mixed with a 20% excess of the stoichiometric amount of sodium carbonate required to convert the refractory metals to water soluble $Na^+$ salts and calcined in a muffle furnace for various periods of time at 950° C. and then leached in water. The effect of calcination time on the percent metal leached is summarized in the table below:

| Effect of Calcination Time (At 950° C.) On Metal Values Leached in Water | | | | |
|---|---|---|---|---|
| Calcination Time (hrs) | Cr % | Mo % | W % | V % |
| 0.25 | 51 | 85 | 85 | 48 |
| 0.5 | 53 | 85 | 85 | — |
| 1.0 | 53 | 85 | 84 | — |
| 2.0 | 53 | 85 | 85 | — |
| 4.0 | 54 | 85 | 85 | — |
| 16.0 | 57 | 90 | 89 | — |

These data indicate that the initial rate of the reaction of the refractory metals in the scap with sodium carbonate is rapid. Within a period of 15 minutes, reasonably large percentages of chromium, molybdenum, tungsten and vanadium were converted to their respective sodium salts. Thereafter, however, prolonged reaction times are required for further gains in the extent of metal values leached.

EXAMPLE 4

The effect of calcination time at 850° C. of hardfacing grindings on the extent of metal values leached is given below:

| Effect of Calcination Time at 850° C. on Extent of W + 6 and Cr + 6 Extraction in Percent | | | | | | |
|---|---|---|---|---|---|---|
| *Na2CO3 | 0.5 hours | | 2 hours | | 16 hours | |
| level, g | W | Cr | W | Cr | W | Cr |
| 0.44 | 44 | 36 | 66 | 33 | 65 | 34 |
| 0.60 | 59 | 53 | 82 | 50 | 100 | 67 |
| 1.00 | 83 | 81 | 100 | 81 | 100 | 100 |

*Added to 2g Oil-Free Hardfacing Grindings

In general, the extent of metal leached increases slightly with increase in calcination time in the time interval studied. The data again indicate that there is an initial rapid rate of formation of the sodium salts of tungsten and chromium, followed by a slow rate of increase.

EXAMPLE 5

Three hundred ml of a 2.0 M $Na_2CrO_4$ solution and 9.2 g of methanol were heated in an autoclave to an average temperature of 200° C. The vapor pressure of the solution at this temperature was about 170 p.s.i. The solution was sampled periodically, filtered to remove any insoluble hydrous $Cr_2O_3$, and analyzed for its $Cr^{+6}$ content. The results obtained are summarized below and show that the $Cr^{+6}$ level in the solution decreases with time.

| Time, | mins | 0 | 11 | 40 | 120 | 180 |
|---|---|---|---|---|---|---|
| $Cr^{+6}$, | g/l | 138 | 131 | 132 | 125 | 121 |

Further, a plot of $1/\sqrt{[Cr^{+6}]}$ vs time gives a reasonably good linear relationship indicating that the reduction rate is adequately represented by the previously described equation:

$$-d[Cr^{+6}]/dt = k_2[Cr^{+6}]^{\frac{1}{2}}[CH_3OH]$$

EXAMPLE 6

A mixture of $Na_2CrO_4$ and methanol identical to that used in Example 5 was heated to 200° C. The stirred solution was sampled at time t=0 mins., and then $CO_2$ was immediately added to the autoclave until a total pressure of about 600 p.s.i.g. was attained. The addition of $CO_2$ under pressure resulted in an exothermic reaction and solution temperature increased within a period of 6 minutes to about 230° C. Thereafter, $CO_2$ was added incrementally to maintain a relatively constant total pressure of about 600 p.s.i.g. The average solution temperature during the run was 233° C. At 233° C. the vapor pressure of pure water is 413 p.s.i. In view of the high ionic strength of the solution in this example, the solution vapor pressure is less than that of pure water. Accordingly, the $CO_2$ partial pressure, $PCO_2$, is larger than 190 p.s.i.a. The effect of time on $Cr^{+6}$ concentration is set forth below:

| Time, | mins | 0 | 4 | 10 | 20 |
|---|---|---|---|---|---|
| $Cr^{+6}$, | g/l | 108 | 81 | 53 | 36 |

EXAMPLE 7

300 ml of 0.2 M $Na_2CrO_4$ and 0.96 g of methanol were heated in the autoclave to an average temperature of 212° C. At this temperature the pressure in the autoclave was 240 p.s.i. The solution in the autoclave was sampled, and immediately thereafter, $CO_2$ was admitted into the autoclave until an average total pressure of about 525 p.s.i. was attained. The start of the run was taken to have occurred when the $CO_2$ was added to the autoclave. This average pressure was maintained throughout the duration of the run by incremental additions of $CO_2$. The $CO_2$ partial pressure, $PCO_2$, was calculated to be 285 p.s.i.a. The solution was periodically sampled and the results obtained are set forth below:

| Time, | mins | 0 | 4 | 8 | 16 | 30 | 45 |
|---|---|---|---|---|---|---|---|
| $Cr^{+6}$ | g/l | 8.4 | 7.9 | 6.9 | 6.0 | 4.2 | 3.7 |

EXAMPLE 8

A solution of $Na_2CrO_4$ and methanol similar in composition to that of Example 7 was heated to 228° C. The solution was sampled and immediately thereafter $CO_2$ was admitted to the autoclave (taken as the start of the run) until an average total pressure of about 530 p.s.i. was attained. The pressure was thereafter maintained by incremental addition of further amounts of $CO_2$. Under these conditions the $PCO_2$ is calculated to be about 155 p.s.i.a. The following data disclose the effect of reaction time on $Cr^{+6}$ concentration under these conditions.

| Time, | Mins | 0 | 4 | 8 | 16 | 30 | 45 |
|---|---|---|---|---|---|---|---|
| $Cr^{+6}$, | g/l | 5.4 | 4.8 | 4.1 | 3.1 | 2.5 | 2.5 |

The data of Examples 7 and 8, obtained at 212° C. and 228° C., respectively, are plotted in terms of $1/\sqrt{[Cr^{+6}]}$ vs time in FIG. 4. As shown by the slopes of the plots, an increase in temperature from 212° C. to 228° C. results in a substantial increase in the reduction rate. Neglecting the effect of variation of $PCO_2$ upon reduction rate, the date of Examples 7 and 8 suggest that the activation energy for the reduction of $Cr^{+6}$ to $Cr^{+3}$ with $CH_3OH$ is on the order of 23 kcals/mole.

In order to obtain a measure of the effect of $CO_2$ on reduction rate it is necessary to compare reduction data at the same temperatures. Unfortunately, in the cases of Examples 5 and 6, the reduction data were obtained at average temperatures which are different from those of Examples 7 and 8. Accordingly, in order to make comparison possible, the date of Examples 5 and 6 were adjusted to 212° C. by using 23 kcals/mole as the activation energy in conjunction with the Arrhenius equation $k = Ae^{-E_a/RT}$ and the equation:

$$1/\sqrt{[Cr^{+6}]} = k_2 t/4 + 1/\sqrt{[Cr^{+6}]}_i$$

Using this temperature compensation procedure, the data of Examples 5 and 6 are also plotted in FIG. 4. It is apparent, therefore, that in the absence of $CO_2$, the rate of reduction, given by the slope of the plots, is slow. In the presence of $CO_2$, the reduction rate is increased by more than one order of magnitude.

EXAMPLE 9

After completion of each of the runs described in Examples 5 through 8, the autoclave was cooled to room temperature and the slurries formed therein were filtered. In all cases the slurries were readily filterable and the resulting green hydrous chromium oxide cakes were readily washed. After washing, the solids contents of the filter cakes were found to range from 56 to 73% by weight, with an average solids content of 66±8%, by weight. Further, the dried hydrous chromium oxide products were each insoluble in mineral acids.

EXAMPLE 10

300 ml of 2.0 M $Na_2CrO_4$ and 100 ml of 9.0 M HCOONa, each having a pH of 13, were mixed and rapidly heated to an average temperature of 211° C. The $Cr^{+6}$ concentration was then determined as a function of time. The results obtained follow:

| Time, | mins | 0 | 60 | 120 | 180 | 240 | 300 |
|---|---|---|---|---|---|---|---|
| $Cr^{+6}$, | g/l | 69 | 59 | 50 | 43 | 36 | 30 |

EXAMPLE 11

The experiment of Example 10 was repeated at an average temperature of 240° C. and the results obtained are as follows:

| Time, | mins | 1.0 | 6.0 | 14 | 20 | 30 | 40 | 120 | 155 |
|---|---|---|---|---|---|---|---|---|---|
| $Cr^{+6}$, | g/l | 69 | 65 | 58 | 51 | 45 | 38 | 15 | 12 |

Plots of $1/\sqrt{[Cr^{+6}]}$ vs time for the date of Examples 10 and 11 are illustrated in FIG. 5. Reasonably good linear relationships are obtained and indicate that the data can be adequately described by an equation similar in form to that employed in Example 8. Further, as shown by the slopes of the plots, an increase in temperatures from 211° to 240° C. results in a substantial increase in the reduction rate and indicates that the activation energy for the reduction of $Cr^{+6}$ to $Cr^{+3}$ in alkaline media with HCOONa is of the order of 20–30 kcals/mole.

EXAMPLE 12

300 ml of 2.0 M $Na_2CrO_4$ and 100 ml of 9.0 M HCOONa were mixed and rapidly heated to an average temperature of 195° C. The solution was sampled, and at the start of the run sufficient $CO_2$ was admitted to the autoclave to bring the pressure therein to about 440 p.s.i. As a result of an exothemic reaction a rapid rise in temperature (within 3.5 mins) to 250° C. was noted while total pressure was maintained at about 440 p.s.i. by incremental additions of $CO_2$. Although this pressure is less than the vapor pressure of pure water at 250° C., the very high ionic strength of the solution results in a substantial diminuation of the vapor pressure; therefore, the reaction was continuously conducted in the presence of $CO_2$. The $Cr^{+6}$ concentrations, determined as a function of time at 250° C., are set forth below:

| Time, | mins | 0 | 2 | 4 | 6 | 8 | 10 | 20 |
|---|---|---|---|---|---|---|---|---|
| $Cr^{+6}$, | g/l | 55 | 19 | 12 | 8.1 | 6.3 | 5.2 | 1.9 |

The data of Example 12 when plotted in terms of $1/\sqrt{Cr^{+6}}$ vs time yield a linear relationship. In order to compare the reduction rates in the presence and absence of $CO_2$ at the same temperature, the data of this example were compensated to a temperature of 240° C. using an activation energy of 25 kcals/mole. Using this compensation procedure, the data was plotted (FIG. 5). Comparison of the slopes of the lines at 240° C. indicate that the rate of reduction of $Cr^{+6}$ to $Cr^{+3}$ with HCOONa is more than one order of magnitude greater when conducted in the presence of $CO_2$.

The solids contents of the washed hydrous $Cr_2O_3$ filter cakes of Examples 11 and 12 were determined to be about 80% and 45%, respectively, by weight.

EXAMPLE 13

300 ml of 1.0 M $Na_2Cr_2O_7$ solution was charged to the autoclave and heated to 150° C. At this temperature 100 ml of 9 M HCOONa was pumped into the autoclave which was then rapidly heated to an average temperature of 195° C. The $Cr^{+6}$ concentration determined as a function of time is listed below. Comparison of the data of Example 9 with others disclosed herein indicate that, employing HCOONa as the reductant, solutions of $Na_2Cr_2O_7$ are much more readily reduced than are those of $Na_2CrO_4$.

| Time, | mins | 0 | 6 | 15 | 55 | 85 |
|---|---|---|---|---|---|---|
| $Cr^{+6}$, | g/l | 32 | 16 | 11 | 2 | 0.03 |

EXAMPLE 14

300 hundred ml of a stirred 2.0 M $Na_2CrO_4$ solution at pH 13.0 was heated to 100° C. 100 ml of 9 M formaldehyde solution was then pumped into the autoclave at 100° C. The solution was sampled periodically and the $Cr^{+6}$ content of the samples determined. The results of these analyses are shown below.

| Time, | mins | 0 | 2.2 | 6.2 | 20 | 50 | 120 | 180 |
|---|---|---|---|---|---|---|---|---|
| $Cr^{+6}$, | g/l | 78 | 65 | 58 | 53 | 47 | 41 | 40 |

The data show that the $Cr^{+6}$ concentration of the solution is initially rapidly depressed but that the reduction rate shortly thereafter declines such that prolonged reduction times are required for further decrease in the $Cr^{+6}$ concentration. The run was terminated after three hours and the autoclave cooled to room temperature. The slurry formed was found to have a pH of 9.6 and had a strong odor suggestive of caramelized sugar. These observations indicate that in addition to reducing $Cr^{+6}$ to $Cr^{+3}$, the formaldehyde undergoes undesirable side reactions, the products of which side reactions are not themselves effective reductants of $Cr^{+6}$ at 100° C.

The slurry was filtered and washed, and a violet cake of hydrous $Cr_2O_3$ was obtained which contained 43% by weight solids. The cake was readily soluble in minerals acids such as HCl or $H_2SO_4$.

EXAMPLE 15

300 ml of 2.0 M $Na_2CrO_4$ solution was introduced into an autoclave together with 0.3 moles of $CO_2$. The autoclave was heated to 100° C. At time t=0, 100 ml of 9 M HCHO was pumped into the stirred autoclave, and the $Cr^{+6}$ content of the solution and the total pressure, $P_T$, in the autoclave were determined as a function of time. The results obtained are tabulated below. $P_T$ represents the sum of the partial pressures of water, HCHO, and $CO_2$ at 100° C. Since both HCHO and $CO_2$ are consumed during the reduction process, $P_T$ declines with time. The $Cr^{+6}$ content also declines with time. Comparison of the reduction data of Examples 14 and 15 indicates that the initial rates of reduction of $Cr^{+6}$ with HCHO are reasonably comparable. The extent of reduction experienced in the present example is, however, substantially greater. Thus, the parasitic side reactions involving the formaldehyde reductant are substantially reduced in the presence of $CO_2$.

| Time, | mins | 0 | 2 | 4 | 10 | 30 | 60 | 90 | 150 | 210 |
|---|---|---|---|---|---|---|---|---|---|---|
| $Cr^{+6}$, | g/l | 78 | — | 63 | 56 | 44 | 34 | 29 | 25 | 23 |
| $P_T$, | p.s.i. | 160 | 140 | 130 | 120 | 90 | 60 | 45 | 30 | 25 |

The final reaction slurry had a pH of 8.1 at room temperature. The washed hydrous $Cr_2O_3$ cake isolated from the slurry had a solids content of 60%, by weight, and was soluble in HCl or $H_2SO_4$.

EXAMPLE 16

In order to show that formaldehyde precursors can also be utilized as reductants, 400 ml of 1.5 M $Na_2CrO_4$ was mixed with 30 g of paraformaldehyde. The mixture was heated to 150° C. and sampled. Over the period of the run $Cr^{+6}$ content of the solution declined from 78 g/l to 34 g/l and the hydrous $Cr_2O_3$ produced was acid soluble.

EXAMPLE 17

At reduction temperatures below 150° C., as already discussed, formaldehyde is oxidized to $HCOO^-$. However, $HCOO^-$ can reduce $Cr^{+6}$ to $Cr^{+3}$ at higher temperatures. In order to show that at higher reduction temperatures the extent of reduction attained is increased, 300 ml of 2.0 M $Na_2CrO_4$, 0.3 moles $CO_2$, and 50 ml of 9 M HCHO were charged to the autoclave and heated to 235° C. over a period of 72 minutes. The $Cr^{+6}$ content of the solution declined from 72 g/l to 0.13 g/l. The filtered and washed hydrous $Cr_2O_3$ cake product was acid insoluble.

EXAMPLE 18

A synthetic solution containing the $Na^+$ salts of $Cr^{+6}$, $Mo^{+6}$, $W^{+6}$ and $V^{+5}$ was reduced with HCOONa in the presence of $CO_2$. Analysis of the intial solution and final slurry yielded the results set forth below. The extent of contamination by the non-chromium metal values is expressed in terms of the weight fraction of the metal value relative to the chromium fraction.

| | Reduction of $Cr^{+6}$ in the Presence of $Mo^{+6}$, $W^{+6}$ and $V^{+5}$ | | | | | | |
|---|---|---|---|---|---|---|---|
| | Solution Composition | | | | | | |
| | $Cr^{+6}$ | | | | Hydrous $Cr_2O_3$ Product | | |
| | g/l | Mo/Cr | W/Cr | V/Cr | Mo/Cr | W/Cr | V/Cr |
| Initial Solution | 47 | 0.8 | 1.03 | 0.37 | — | — | — |
| Final Solution | 2.5 | 14.7 | 14.2 | 5.12 | .02 | 0.04 | 0.1 |

These results indicate that the $Cr^{+6}$ values in a solution of $Na_2CrO_4$ containing substantial impurity metal/$Cr^{+6}$ ratios can be reduced from 47 g/l to 2.5 g/l. Additionally, impurity metal/$Cr^{+6}$ ratios in the final solution are significantly higher than those of the initial solution indicating that the bulk of the impurities remain in solution. This is further supported by the much smaller impurity to Cr ratios in the filtered and washed hydrous $Cr_2O_3$ product than in the initial solution.

EXAMPLE 19

Three hundred ml of a synthetic leach liquor containing 1.5 M/l $Na_2CrO_4$, 0.2 M/l $NaHCO_3$, and 0.1 M/l $NaCO_3$ was heated to 210° C. The vapor pressure of the solution at 210° C. was found to approximate that of pure water and was about 265 psig. To the stirred solution at 210° C., CO was added until a total pressure of 380 psig was attained and this total pressure was maintained constant throughout the run. The CO partial pressure for this run was calculated by difference to be 120 psia. The solution was sampled periodically, filtered to remove insoluble hydrous $Cr_2O_3$, and analyzed for its $Cr^{+6}$ content. The data obtained are summarized in the table below and show that the $Cr^{+6}$ level in the solution is reduced. Further, a plot of $\sqrt{Cr^{+6}}$ vs. time gives a reasonably good linear relationship.

| REDUCTION OF $Na_2CrO_4$ WITH CO AT 210° C. | | | | | | | | | |
|---|---|---|---|---|---|---|---|---|---|
| Time, | Mins. | 3 | 5 | 8 | 12 | 18 | 20 | 27 | 50 | 91 |
| $Cr^{+6}$, | g/l | 65 | 60 | 57 | 48 | 38 | 17 | 10 | 2.1 | 0.1 |

EXAMPLE 20

A solution similar to that used in Example 16 was heated to an average temperature of 211° C. and the CO was introduced to maintain the total system pressure constant at 545 psig. In this case the CO partial pressure was calculated to be 280 psia. The effect of time on $Cr^{+6}$ concentration is summarized in the table below:

| REDUCTION OF $Na_2CrO_4$ WITH CO AT 211° C. | | | | | | |
|---|---|---|---|---|---|---|
| Time | Mins. | 8 | 12 | 18 | 23.3 | 28.3 |
| $Cr^{+6}$, | g/l | 62 | 44 | 15 | 3.9 | 1.1 |

The data in the table when plotted in terms of $Cr^{+6}$ vs. time also gives a linear relationship. Moreover, the reduction experiments of Examples 19 and 20 were obtained at essentially the same temperature, but at different constant $P_{CO}$ values. Under these conditions, the value of the slope of the plot of $[Cr^{+6}]^{\frac{1}{2}}$ vs. time divided by $P_{CO}$, i.e., slope/$P_{CO}$ for these two examples is constant within experimental error.

EXAMPLE 21

In order to determine the effect of temperature on the value of slope/$P_{CO}$, solutions similar in composition to that of Example 19 were reduced with CO at 214° and at 235° C. At 214° C. total system pressure was 340 psig and $P_{CO}$, determined by difference, was 56 psia. At 235° C. total system pressure was 580 psig and $P_{CO}$ was 161 psia. The effect of time on $Cr^{+6}$ is summarized in the table below:

| REDUCTION OF $Na_2CrO_4$ WITH CO AT 214° C. | | | | | | |
|---|---|---|---|---|---|---|
| Time | Mins | 2 | 24 | 48 | 72 | 96 | 120 |
| $Cr^{+6}$, | g/l | 68 | 43 | 23 | 10 | 2.8 | 0.48 |
| REDUCTION OF $Na_2CrO_4$ WITH CO AT 235° C. | | | | | | |
| Time | Mins | 2 | 8 | 17 | 25 |
| $Cr^{+6}$, | g/l | 64 | 31 | 10 | 1 |

Plots of the data of these tables are illustrated in FIG. 6. Evaluation of the value of slope/$P_{CO}$ as a function of temperature for a variety of temperatures using temperature control of the liquor (Mode I) and control of the furnace temperature while monitoring the temperature of the liquid (Mode II) are summarized in the table below:

| EFFECT OF TEMPERATURE ON SLOPE/$P_{CO}$ | | |
|---|---|---|
| Method of Temperature Control | Average Temperature (°C.) | Slope/$P_{CO}$ ((g/l) $\frac{1}{2}$/min. psia) |
| Mode I | 175 | $1.6 \times 10^{-4}$ |
| | 208 | $1.0 \times 10^{-3}$ |
| | 210 | $1.2 \times 10^{-3}$ |
| | 211 | $1.2 \times 10^{-3}$ |
| | 252 | $6.0 \times 10^{-3}$ |
| Mode II | 206 | $3.9 \times 10^{-4}$ |
| | 214 | $1.2 \times 10^{-3}$ |
| | 220 | $1.1 \times 10^{-3}$ |
| | 220 | $1.8 \times 10^{-3}$ |
| | 235 | $1.8 \times 10^{-3}$ |

The relationship between the value of $\ln(\text{slope}/P_{CO})$ vs. the reciprocal of temperature is illustrated in FIG. 7 for both Mode I and Mode II temperature control. The data for Mode I temperature control, shown by the solid circles, give a fairly good linear relationship from which an activation energy of 22 kcals/mole is computed. The data for Mode II temperature control are much more scattered and lie below the line drawn through the points for Mode I temperature control. Since somewhat different methods of temperature control were employed with each set of data and since in the case of Mode I temperature control variations of 10° C. were observed during the course of a single run, the differences between the two sets of data is not surprising. Unfortunately, the data for Mode II temperature control were obtained over a small temperature range. Nevertheless, the data can also be fitted to a reasonable linear relationship (shown by the dashed line) having about the same slope as that shown for Mode I temperature control.

EXAMPLE 22

In order to show that CO is capable of reducing the $Cr^{+6}$ concentration to very low levels, a synthetic solution having a composition similar to that of Example 19 was heated to 220° C. and then pressurized with CO to a total pressure of 590 psi. Analysis of the solution after 2 minutes and 110 minute, indicated that the $Cr^{+6}$ concentration was reduced from 65 g/l to 0.02 g/l. In other words more than 99.9% of the original $Cr^{+6}$ content of the solution was reduced to hydrous $Cr_2O_3$.

EXAMPLE 23

After reduction of the solutions of Examples 19–22 the autoclave was cooled, opened, and the slurries were dewatered on a vacuum filter. The resulting green hydrous $Cr_2O_3$ cakes were thoroughly washed and then the percent solids content of the washed cakes were determined. The filter cake solids ranged from 51 to 79% solids with an average of 69±9% solids. These solids may be contrasted with the cake solids obtained using more typical reducing agents. For example, reduction of 1 M $Na_2CrO_4$ solutions with $SO_2$ at 80° C. gives cakes with less than 30% solids. In addition, the hydrous $Cr_2O_3$ product obtained by the process of this invention are acid insoluble.

EXAMPLE 24

Four hundred mls of a 0.2 M/l $Na_2CrO_4$, 0.04 M/l $NaHCO_3$, and 0.2 M/l $Na_2CO_3$ solution with 1.71 g of devolatized carbon black having a surface area of 120 $m^2/g$ (e.g., devolatized Black Pearls L) was heated to 200° C. with stirring. CO was then added to maintain the total system pressure constant at 580 psi. After 25 minutes the $Cr^{+6}$ content of the solution had declined to 3.5 ppm, and an intimate mixture of hydrous $Cr_2O_3$ and carbon black was obtained.

EXAMPLE 25

A sample of Ni-based superalloy grindings is mixed with $Na_2CO_3$ and the resulting mixture calcined overnight in a muffle furnace maintained at a temperature of about 1000° C. The calcined material is leached in water, filtered, washed, and evaporated to yield 1.6 liters of a pregnant leach liquor containing 176 g/l $Na^+$, 79 g/l $Cr^{+6}$, 79 g/l $Mo^{+6}$ and 38 g/l $W^{+6}$. The amounts of other alkali soluble impurities such as $Al^{+3}$ and $Si^{+4}$ is found to be negligibly small. Based on the foregoing analyses and the electro-neutrality principle, it is calculated that the leach liquor contains 2.4 moles $Na_2CrO_4$, 1.3 moles $Na_2MoO_4$, 0.33 moles $Na_2WO_4$, and 2.1 moles $Na_2CO_3$.

To the stirred leach liquor, maintained at 80° C., 3.75 moles of $Ca(OH)_2$ is added over a period of 30 minutes. Thereafter, 3.7 moles of formic acid (88%, by weight, aqueous solution) is added dropwise with vigorous stirring of the reaction slurry. After addition of the formic acid, the reaction slurry volume is determined to be about 1.9 liters. The reaction slurry is then filtered on a vacuum filter and the resulting collected filter cake is washed with one liter of water to yield a washed Cake A. The filtrate and filter cake washings are combined to yield 2.6 liters of Solution A. Upon analysis, Solution A is found to contain only trace amounts of $Ca^{+2}$, over 99% of the original $Cr^{+6}$ values, about 10% of the original $Mo^{+6}$ values and less than 1% of the original $W^{+6}$ values. Approximately 900 g of wet Cake A, which is pale yellow in color and comprises 60% by weight solids, is obtained. Based on analyses of the leach liquor and Solution A and on further dissolution studies of Cake A in HCl and then NaOH, Cake A is found to contain approximately 150 g $Ca^{+2}$, 61 g $W^{+6}$, 116 g $Mo^{+6}$, and 1.2 g $Cr^{+6}$.

Cake A is stirred in water and made up to a total volume of three liters. To this slurry at room temperature, 2.5 moles of formic acid (88 weight percent aqueous solution) is slowly added. During addition of the formic acid effervesence occurs as a result of $CO_2$ evolution. After addition of the formic acid the slurry is agitated for a further two hours and then filtered to yield a filtrate which, upon analysis, is found to contain 0.25 g/l Cr about 0.2 g/l Mo, 0.07 g/l W and 28 g/l Ca. The resulting filter cake is washed yielding 480 g of a washed Cake B containing 70% by weight solids. These data indicate that treatment of Cake A with HCOOH results in substantial dissolution of its $Ca^{+2}$ and $Cr^{+6}$ values. Therefore, Cake B which is enriched with respect to its Mo and W values can be more readily treated to effect a separation between its Mo and W values.

Solution A, containing over 99% of the $Cr^{+6}$ values, HCOONa and minor amounts of $Mo^{+6}$ and $W^{+6}$ can be mixed with the requisite amount of reductant, and heated to 250° C. in the presence of $CO_2$ to precipitate a major fraction of the Cr values as hydrous $Cr_2O_3$ product. Under these conditions, the bulk of $Mo^{+6}$ and $W^{+6}$ contained in Solution A will remain in solution. The $Mo^{+6}$, $W^{+6}$ and unreduced $Cr^{+6}$, together with the carbonates and bicarbonates formed, can be removed from the aqueous phase and recycle to the calcination process.

EXAMPLE 26

A 200 g sample of chromite ore was mixed with an equal weight of $Na_2CO_3$ and then calcined at 960° C. for six hours. Thereafter the calcined material was slurried in 800 ml $H_2O$ at 80° C. and filtered. The resulting cake was washed with 410 ml of water and the wash water and filtrate were combined to give Solution A having a pH of 13. Solution A was heated to 80° C. and then $CO_2$ was sparged through the solution to precipitate hydrous oxides of Al and Si. Sparging was continued until a pH of 9.6 was attained. The solution was filtered to give Solution B. Five hundred mls of Solution B is charged to an autoclave, heated to 250° C. and CO is introduced into the autoclave to maintain a total pressure in excess of 650 psi. Ten minutes after introduction of CO, the addition is discontinued and the autoclave is cooled down to room temperature. The excess CO is vented off and the slurry in the autoclave is filtered off to give Solution C and a precipitate of hydrous $Cr_2O_3$, which after washing, has a cake solids content of 65%. A mixture of $Na_2CO_3$ and $NaHCO_3$ together with the unreduced $Na_2CrO_4$ can be isolated from Solution C and recycled to treat further chromite ore. The compositions of the solutions are illustrated in the table below.

| | RECOVERY OF HYDROUS $Cr_2O_3$ FROM CHROMITE ORES | | |
|---|---|---|---|
| Solution | Al g/l | Si g/l | Cr g/l |
| A | 5.02 | 0.12 | 44.0 |
| B | 0.00 | 0.02 | 44.5 |
| C | — | — | 0.4 |

EXAMPLE 27

Aliquots of 1 M $MgSO_4$ solution were added to a synthetic leach solution containing 0.081 moles of $Na_3PO_4$ (2.5 grams P+5/l). A white precipitate resulted. It was found that as magnesium sulphate was added, the $Mg^{++}$ concentration remained low (less than about 0.004 grams per liter) until at least the stoichiometric amount required to form $MgHPO_4$ was added. Thereafter, the $Mg^{++}$ content of the solution rapidly increased with further additions of $MgSO_4$. Repetition of this experiment using a real leach liquor having a pH of about 8.5 at 80° C. (where $HCO_3^-$ is the predominant species), showed that the p+5 content of the leached liquor can be reduced to about $1 \times 10^{-3}$ mole per liter. In such solutions, it is anticipated that the maximum concentration of $HCO_3^-$ and $CO_3^=$ will not exceed 0.5-1.0 moles per liter. At a pH of 8.5 and 80° C., the bulk of the $Mg^{++}$ added to the solution is utilized in the precipitation of $MgHPO_4$. Furthermore, at this solution pH and temperature, the level of magnesium in solution required to obtain a p+5 concentration of $1 \times 10^{-3}$ moles/liter is about 0.7 grams per liter.

EXAMPLE 28

A leach solution containing 0.75 moles per liter combined carbonate and bicarbonate and 0.04 moles per liter ammonium hydroxide at pH 9 and 80° C., when treated with MgSO$_4$, results in a solution having a p+5 concentration of about 1×10$^{-3}$ mole per liter and a white precipitate of MgNH$_4$PO$_4$.

EXAMPLE 29

Synthetic pregnant liquors were prepared containing Na$_2$MoO$_4$, Na$_2$WO$_4$, NaVO$_3$, Na$_2$CO$_3$ and minor amounts of Na$_2$O.nSiO$_2$ and Na$_2$HPO$_4$ at the concentrations and molar ratios expected from the leaching of fused tool steel grindings. Sodium chromate was added to these solutions at two different levels, (about 22 g Cr/l and 63 g Cr/l), resulting in two 400 ml samples. Carbon dioxide was absorbed into these solutions (P$_{CO2}$=1 atm) at room temperature to convert some of the chromate to dichromate and the carbonate to bicarbonate. The pH dropped from 12.6 to the range of 6.8–7.1 in these two experimental runs. Sodium bicarbonate precipitated and was removed by filtration. The solutions before and after NaHCO$_3$ rejection, labelled A$_1$ and A$_2$ and B$_1$ and B$_2$, respectively were analyzed and the data obtained are set forth in the table below:

| Rejection of NaHCO$_3$ From Pregnant Leach Liquors | | | | | |
|---|---|---|---|---|---|
| Soln | Cr g/l | V g/l | W g/l | Mo g/l | Na g/l |
| A$_1$ | 22 | 7.8 | 14 | 60 | 90 |
| A$_2$ | 18 | 6.1 | 11 | 51 | 56 |
| B$_1$ | 63 | 7.6 | 11 | 50 | 170 |
| B$_2$ | 66 | 7.6 | 11 | 52 | 120 |

The data in the table indicate that the metal contents of the solutions, before and after CO$_2$ addition followed by filtration, are essentially unchanged except for their Na contents. In this case, a substantial reduction in the Na$^+$ content is observed.

Solutions A$_2$ and B$_2$ were heated to 70° C. and then treated with a 1 M Mg(HCOO)$_2$ solution in order to remove phosphorus from solution. Although the solution pHs were less than the preferred pH of 8.5, significant precipitation of MgHPO$_4$ was obtained. The resulting slurries were filtered and the cakes obtained were washed. Each set of washings and filtrate was combined to give solutions A$_3$ and B$_3$. To these stirred solutions at 70° C. an excess of the stoichiometric requirement of Ca(OH)$_2$, to precipitate Mo, W and V, was added. The pHs of the resulting slurries increased to values in excess of 11.5. Analysis of the solutions indicated that 80–90% of the soluble Mo was removed from solution. Addition of small amounts of 88% formic acid to the slurries (20 g HCOOH/l to slurry A$_3$ and 10 g/l to slurry B$_3$) resulted in further diminution of the soluble Mo contents of the slurries. Thereafter, the slurries were filtered and the filtrates A$_4$ and B$_4$ were analyzed. In addition, a sample of the washed calcium cake was leached with concentrated HCl in order to solubilize the V, Cr, Mo and Ca values. Analysis of this solution gives a good measure of the extent of Cr contamination of the cake. The results of these analyses are set forth in the table below.

| | Effect of Ca(OH)$_2$ Treatment | | | | |
|---|---|---|---|---|---|
| | Cr g/l | V g/l | W g/l | Mo g/l | Ca g/l |
| Soln A$_3$ | 20 | 7.6 | 10.5 | 47 | 0.00 |
| Soln A$_4$ | 36 | 0.01 | 0.02 | 0.65 | 0.06 |
| Cake A | 0.28 | 1.9 | — | 13.4 | 17.0 |
| Soln B$_3$ | 44 | 4.1 | 6.5 | 26 | 0.00 |
| Soln B$_4$ | 46 | 0.5 | 0.2 | 4.9 | 0.02 |
| Cake B | 0.16 | 1.7 | — | 19.8 | 12 |

The data in the table show that treatment of the pregnant liquor, after NaHCO$_3$ rejection, with Ca(OH)$_2$ and small amounts of formic acid results in substantial removal of Mo, W and V values from solution. As noted previously, the amount of HCOOH consumed per liter of solution is approximated by the expression $$[\text{HCOOH}] = \text{Na} - 2[\text{CrO}_4^{2-}] - 6[\text{Cr}_2\text{O}_7^{2-}] - 0.2$$

Application of this equation to the observed compositions of solutions A$_1$ and B$_1$ indicate that without NaHCO$_3$ rejection the amounts of formic acid required to reduce the Mo, W and V values to comparably low levels are greater than 100 g/l. Finally, the observed Cr to Mo ratios in the cakes shows that the extent of Cr contamination of the cakes is fairly small.

EXAMPLE 30

Degreased tool steel (100 parts) was mixed with 20 parts Na$_2$CO$_3$ and fused overnight at 800° C. The fused material (1426 g) was leached with water, filtered, washed, and the combined filtrate and washings were evaporated down to 610 mls. This solution was found to contain a smaller than desired Cr$^{+6}$ content. The Cr$^{+6}$ content was increased by addition of 62.7 g Na$_2$CrO$_4$ to the leach solution. Analysis of the resulting leach solution gave the following: 32 g/l Cr, 59 g/l Mo, 26 g/l W, and 10.5 g/l V.

To a 100 ml volume of the leach solution aliquots of 1 M Ca(HCOO)$_2$ were added at 80° C. while solution pH was maintained constant by addition of NaOH or HCOOH. After each successive addition of Ca(HCOO)$_2$, the slurry was sampled and the metal values, including Ca$^{+2}$, in the aqueous phase of the solution were determined.

These experiments were conducted at pH 6, 8, and 10. In order to study the effect of higher pH, portions of solid Ca(OH)$_2$ up the stoichiometric amount (0.11 moles) required to precipitate all the Mo$^{+6}$, W$^{+6}$, and V$^{+5}$ values was added. Since, in the presence of Ca(OH)$_2$ equilibrium reactions such as those shown below occur,

| | |
|---|---|
| Na$_2$MoO$_4$ + Ca(OH)$_2$ | 2NaOH + CaMoO$_4$ |
| Na$_2$WO$_4$ + Ca(OH)$_2$ | 2NaOH + CaWO$_4$ |
| 2Na$_3$VO$_4$ + Ca(OH)$_2$ | 6NaOH + 3CaO . V$_2$O$_5$ | incomplete precipitation results. Complete precipitation can be assured by neutralization of the NaOH generated. In this work, since it was desired to maintain the highest possible pH, the neutralization was accomplished by addition of Ca(HCOO)$_2$ which can be viewed as consuming NaOH by precipitation of Ca(OH)$_2$ according to:

$$\text{Ca(HCOO)}_2 + 2\text{NaOH} \rightarrow \text{Ca(OH)}_2 + 2\text{HCOONa}$$

Under these conditions the system is self-buffering and precipitation of the metal values occurs at the highest possible pH.

The efficacy of the precipitation process at each pH was studied by determining the fraction of $Mo^{+6}$, $W^{+6}$, and $V^{+5}$ precipitated at each level of $Ca^{+2}$ attained in solution. The data obtained are set forth below.

| Solution pH | $Ca^{+2}$ in Solution g/l | Percentage of Metal Precipitated | | |
|---|---|---|---|---|
| | | Mo | W | V |
| 6.0 | 0.03 | 47 | 25 | 27 |
| 6.0 | 0.41 | 79 | 59 | 39 |
| 6.0 | 0.95 | 94 | 61 | 50 |
| 6.0 | 5.4 | 98 | 82 | 55 |
| 8.0 | 0.001 | 78 | 88 | 27 |
| 8.0 | 0.10 | 98 | 93 | 55 |
| 8.0 | 4.6 | 98 | 97 | 57 |
| 10.0 | 0.001 | 42 | 89 | 17 |
| 10.0 | 0.002 | 68 | 98 | 38 |
| 10.0 | 0.012 | 87 | 100 | 77 |
| 10.0 | 0.07 | 99 | 100 | 99 |
| >11.5 | 0.004 | 27 | 81 | 95 |
| >11.5 | 0.019 | 94 | 100 | 100 |
| >11.5 | 0.059 | 99 | 100 | 100 |

Solution pH has a substantial effect on the efficiency of the precipitation process. This is expected since the extent of condensation of the simple anions to form polyacids is pH dependent. The data show the following:

(1) At pH 6 the ease of precipitation decreases in the order $Mo^{+6}$, $W^{+6}$, $V^{+5}$ for a given $Ca^{+2}$ addition. However, precipitation is incomplete after addition of the stoichiometric amount of $Ca^{+2}$, and $Ca^{+2}$ concentration in solution rapidly builds up to high values.

(2) At pH 8 the ease of precipitation decreases in the order $W^{+6}$, $Mo^{+6}$, and $V^{+5}$. Further, both the $Mo^{+6}$ and $W^{+6}$ contents of the solution are substantially reduced before buildup of the $Ca^{+2}$ concentration in solution. $V^{+5}$ precipitation is incomplete.

(3) At pH 10 the ease of precipitation decreases in the order $W^{+6}$, $Mo^{+6}$, and $V^{+5}$. Better than 90% of all the metal values are precipitated before the $Ca^{+2}$ concentration increases much above 0.3 g/l.

(4) At pH 12 the ease of precipitation decreases in the order $V^{+5}$, $W^{+6}$, and $Mo^{+6}$. After addition of the stoichiometric requirement of $Ca^{+2}$ (0.11 moles) as $Ca(OH)_2$, significant amounts of $W^{+6}$ and $Mo^{+6}$ were present in solution as a result of the equilibria set forth above. In order to reduce all the metal values to more acceptable levels, $Ca(HCOO)_2$ was added in sufficient excess that well over 95% of the $Mo^{+6}$ content was removed from solution. The $Ca^{+2}$ concentration, even after addition of excess $Ca(HCOO)_2$, did not exceed 0.06 g/l.

The foregoing data indicate that $V^{+5}$, $W^{+6}$, and $Mo^{+6}$ can be efficiently removed from leach solutions by addition of $Ca^{+2}$ at pH values ranging from 10-12. Under these conditions, the purity of the remaining $Na_2CrO_4$ solution is adequate for reduction.

EXAMPLE 31

The $Ca^{+2}$ wet cake produced during the precipitation of Mo and W contains substantial amounts of $CaCO_3$ which affects the Mo/W separation process. For this reason it would be highly desirable to eliminate the $CaCO_3$ present in the wet cake. As shown in the table below, it was found that formic acid could be utilized to selectively dissolved the $CaCO_3$ together with some $CaCrO_4$. In these experiments, washed wet cakes of $Ca^{+2}$ obtained from a leach liquor were slurried in 200 ml of 10 M formic acid. The slurry was then filtered and analyzed.

| EFFECT OF SLURRYING $Ca^{+2}$ WET CAKE WITH 10 M FORMIC ACID | | | | | | | | |
|---|---|---|---|---|---|---|---|---|
| | CAKE I | | | | CAKE II | | | |
| Wt of Initial Wet Cake, g | 228.7 | | | | 152.5 | | | |
| Solids, % | 58 | | | | 63.5 | | | |
| Dry Cake Wt., g | 133 | | | | 97 | | | |
| Wet Cake Wt. After HCOOH Wash, g | 157 | | | | 109 | | | |
| Solids, % | 70.5 | | | | 70.5 | | | |
| Dry Cake Wt., g | 110.5 | | | | 76.6 | | | |
| % Wt. Loss | 17 | | | | 21 | | | |
| Filtrate | Mo | W | Ca | Cr | Mo | W | Ca | Cr |
| Composition, g/l | 0.08 | 0.08 | 45 | 0.2 | 0.11 | 0.04 | 26 | 0.84 |

The data in the foregoing examples indicate that formic acid can be utilized to provide three functions. It can be utilized to dissolve $CaCO_3$ associated with the wet cake, the $Ca(HCOO)_2$ formed can be utilized to precipitate the $Ca^{+2}$ wet cake, and the HCOONa formed can be utilized in the reduction of $Cr^{+6}$.

EXAMPLE 32

A 4.0 g sample of calcium vanadate was added to 500 ml of water in an autoclave. Carbon dioxide was introduced at room temperature to a total pressure of 440 psi while stirring for about 1 hour at 25° C. Liquid withdrawn from the autoclave was found to contain 1.7 g/l vanadium and 2.3 g/l calcium. No solid was found when the autoclave was opened. A white solid compound precipitated out on prolonged standing.

EXAMPLE 33

A synthetic calcium cake containing Mo, W and V at the molar ratios projected for such a cake resulting from processing tool steel grindings was produced by coprecipitation. A 100 gram sample of this cake was repulped with water in the presence of $CO_2$ at a pressure of 150 psi at close to ambient temperature for 30 minutes. The resulting slurry was filtered. The filtrate (aqueous phase) was heated to precipitate calcium vanadate, and analyzed for Mo, W, V and Ca before and after heating. The remaining washed wet cake was analyzed for Mo, W, V and Ca after dissolution in HCl. Results are set forth in the table below:

| | Mo | W | V | Ca |
|---|---|---|---|---|
| Filtrate g/l (before heating) | 0.01 | 0.01 | 3.2 | 1.4 |
| Filtrate g/l (after heating) | 0.01 | 0.02 | 2.3 | 0.6 |
| Cake % | 0.02 | 0.00 | 13.6 | 18.2 |

EXAMPLE 34

A sample of tool steel grindings was mixed with $Na_2CO_3$ and calcined overnight in a laboratory muffle. The calcined product was leached in water. The leach solution pH was reduced to 8.5 in the presence of $Mg^{+2}$ to remove impurities and then subjected to the $NaHCO_3$ rejection process. The resulting solution was treated with $Ca(OH)_2$ and formic acid. The $Ca^{+2}$ precipitate formed was filtered off and washed. The wet cake, containing about 2% $V^{+5}$, was repulped in water (25 g/l $H_2O$) under various pressures of $CO_2$ at close to ambient temperatures for various periods of time. The percentage of the $V^{+5}$ in the cake dissolved at each $CO_2$ pressure as a function of time is set forth below.

| $CO_2$ Pressure (atmospheres) | Percentage of $V^{+5}$ Dissolved After | | | |
|---|---|---|---|---|
| | 5 mins | 10 mins | 20 mins | 60 mins |
| 1 | — | — | — | 76 |
| 3.4 | 62 | 76 | 79 | 84 |
| 13.6 | 85 | 86 | 87 | 87 |
| 27.2 | 84 | 84 | 85 | 86 |

These data show that at elevated $CO_2$ pressures the bulk of the $V^{+5}$ is leached out of the cake within a period of 5 to 10 minutes.

EXAMPLE 35

Oily tool steel grindings (4 parts) were mixed with $Na_2CO_3$ (1 part), pelletized and calcined in a directly fired 6 inch rotary kiln at 800°–1000° C. The average pellet residence time in the kiln was one hour. The calcined pellets were crushed and then leached at 80° C. to produce an essentially saturated leach solution. The pH of the solution, at 80° C., was reduced to 8.5 by means of $CO_2$ sparge. To this solution at 80° C. and at pH 8.5 sufficient MgO was added so that an $Mg^{+2}$ concentration in solution of about 0.4 g/l was attained. As a result of these treatments the bulk of the Al, Si and P impurities were precipitated and removed by filtration. The filtered leach solution was cooled to ambient temperatures and next treated with $CO_2$ so as to reduce the $Na^+$ level by rejection of solid $NaHCO_3$. In order to separate the Cr and Na values from the Mo, W and V values, the resulting solution, at 80° C., was treated with $Ca(OH)_2$ and HCOOH. The bulk of the latter group of metal values was removed from solution as a mixed $Ca^{+2}$ precipitate which was also contaminated with $CaCO_3$. This wet cake was labelled Cake A. Analysis of the solutions before and after treatment with $Ca(OH)_2$, after correction for changes in solution volumes, are set forth below.

| Solution | Normalized Solution Composition | | | | | | | |
|---|---|---|---|---|---|---|---|---|
| | Mo | W | V | Cr | Na | Mg | Si | Al |
| Before $Ca^{+2}$, g/l | 73 | 17.3 | 8.2 | 34.5 | 81 | 0.26 | 0.006 | 0.001 |
| After $Ca^{+2}$, g/l | 2.8 | 0.02 | 0.02 | 33.5 | 70 | 0.04 | 0.006 | 0.002 |

Cake A, on a dry basis, was found to contain 29% Mo, 20% Ca, 7.2% W, 3.1% V, 0.19% Cr and 0.1% Mg. A 80 g sample of the wet cake (70% solids) was repulped in 0.5 liter of water at ambient temperatures and then treated with $CO_2$ at 400 psi for 5 minutes. The resulting slurry was filtered to give 72 g of a washed cake, labelled Cake B, and a filtrate labelled B. Filtrate B was found to contain 2.14 g/l V, 0.37 g/l Ca, 0.03 g/l Cr, 0.045 g/l Mg and less than 0.01 g/l Mo and W. In order to concentrate and recover the V values, this solution was first acidified to pH 2.3 with $H_2SO_4$, filtered and then subjected to the solvent extraction process described in the U.S. Bureau of Mines publication RI 7932 using a tertiary amine. The $V^{+5}$ was stripped from the loaded organic phase with $Na_2CO_3$. A high purity $NH_4VO_3$ product was recovered by treating the $V^{+5}$ containing stripping solution with $NH_3$. The V-barren raffinate, containing $Mg^{+2}$ and $SO_4^{2-}$ may be either directly recycled for further leaching of the V values or, more preferably, first treated with $Ca(OH)_2$ to a pH of about 10.5, filtered and then recycled for further leaching of the V values from the mixed $Ca^{+2}$ cake.

Analysis of Cake B, on a dry basis, showed that it contained 25% Mo, 18% Ca, 6.1% W, 0.6% V, 0.18% Cr and 0.11% Mg. A comparison of the composition of Cakes A and B indicates that the major difference between the two cakes is that Cake B contains considerably less V than Cake A. Unfortunately, the analytical data were not sufficiently accurate to determine the more minor composition changes. Nevertheless, as shown by the data, Cake B contains significant amounts of Ca, V and Cr. The quantities of these metal values were further reduced by leaching Cake B in HCOOH. For these purposes 30 g of Cake B was repulped in 175 ml of 2 N HCOOH and then filtered to give 23 g of washed cake, labelled Cake C, at 78% solids and about 175 ml of filtrate C. This filtrate was found to contain 4.8 g/l Ca, 0.02 g/l Cr, 0.3 g/l V, 0.05 g/l Mg and small amounts of Mo and W. Filtrate C thus consists essentially of calcium formate and formic acid contaminated with relatively minor amounts of the refractory metal values and may be recycled back to the process in place of HCOOH for pH adjustment. Under these conditions the formic acid is utilized to upgrade Cake B, then utilized in the $Ca^{+2}$ precipitation process, and finally consumed in the reduction of $Cr^{+6}$. Further, any refractory metal values dissolved in the formic acid leach are recycled and eventually recovered.

Analysis of Cake C indicates that, on a dry basis, it contains 15.5% Ca, 32% Mo, 7.8% W, 0.47% V, 0.2% Cr and 0.02% Mg. Cake C may be further treated according to the processes described in subsequent examples to recover the Mo and W values and recycle the remaining V and Cr values.

EXAMPLE 36

A sample of the $Ca^{+2}$ cake, labelled Cake A in Example 35 was leached with 5 M HCOOH under conditions which simulated a two stage counter current decantation process. For these purposes the $Ca^{+2}$ cake was first repulped with a 2 M HCOOH solution. During the repulping sufficient formic acid solution was added so that a slurry pH of 3.0 was attained. The solution was filtered off and discarded. The formic acid treated cake was repulped in 5 M HCOOH at ambient temperature. This slurry was filtered and the filtrate, labelled filtrate D, was slowly added to an aqueous slurry of Cake A until a pH of 6.0 was attained. Thereafter, additional increments of Cake A and filtrate D were added while maintaining slurry pH at 6.0. After addition of 1.7 liters of filtrate D, the slurry was filtered to give filtrate E and Cake E. In order to further upgrade the quality of Cake E it is releached with 5 M HCOOH and then utilized for Mo/W recovery. In order to recover the V values in filtrate D, 1 liter of this filtrate was heated to 80° C. and then $Ca(OH)_2$ was added until a pH 9.0 was attained. Under these conditions the bulk of the refractory metals in the solution together with $Mg^{+2}$ are precipitated and form a crude vanadium product. Accordingly, the resulting slurry was filtered to give filtrate F and Cake F. The analytical data obtained for the filtrates are set forth below.

|  | Mo | W | V | Ca | Cr | Mg |
|---|---|---|---|---|---|---|
| Filtrate D, g/l | 0.4 | 0.04 | 2.3 | 9.5 | — | — |
| Filtrate E, g/l | 0.4 | 0.04 | 17.5 | 33.5 | 0.25 | 0.45 |
| Filtrate F, g/l | 0.1 | 0.02 | 0.0 | 9.0 | 0.03 | 0.09 |

It may be noted that the Mo:V ratio in filtrate E is almost one order of magnitude less than that in filtrate D. Further, after V precipitation, filtrate F consists essentially of calcium formate and may be recycled back to the $Ca^{+2}$ cake precipitation stage thus reducing $Ca(OH)_2$ and HCOOH consumption. The washed calcium vanadate product, Cake F, obtained at 40% solids contained, on a dry basis, 27% V, 12% Ca, and less than 0.5% each of Mo, Cr and Mg.

The quality of the V product was improved by leaching the Cake F with $H_2SO_4$ at pH 2. This leaching process resulted in formation of a $CaSO_4$ precipitate and an aqueous solution rich in $V^{+5}$. Application of the solvent extraction process described in Example 35 resulted in the production of $NH_4VO_3$.

EXAMPLE 37

A mixed calcium cake consisting of solid $CaMoO_4$ and $CaWO_4$ is mixed with an aqueous solution containing various different mixtures of $H_2O_2$, $NH_4HCO_3$, and $NaHCO_3$. The slurry is then pressurized with $CO_2$ gas (400 psi) at room temperature (25° C.) in an autoclave with stirring. Filtration of the slurries under pressure gives an $Mo^{+6}$ and/or $W^{+6}$ containing filtrate. Solid $CaCO_3$ is left behind. Depending on the composition of the leach solution, the filtrate may contain small amount of solibilized calcium. After degassing, the solibilized calcium precipitates as $CaCO_3$. A fraction of the Mo and W values may reprecipitate on degassing. However, the bulk of the solubilized $Mo^{+6}$ and $W^{+6}$ remains in solution. Some results are given in the table below.

Treatment of $CaMoO_4$ or $CaWO_4$ Filter Cakes with Variuos Solutions
(conc. reported in ppm)

| Time Elapsed (min) | Element | $CO_2/H_2O_2$ — | $CO_2/H_2O_2/$ $NH_4HCO_3$ | $CO_2/H_2O_2/$ $NaHCO_3$ | $CO_2/$— $NH_4HCO_3$ |
|---|---|---|---|---|---|
| 15 | Mo | 920 | 6700 | 3870 | 75 |
|  | Ca | 1200 | 1160 | 12 | 3.8 |
|  | W | 1400 | 2000 | 2300 | 0 |
|  | Ca | 500 | 3.9 | 1 | 1.4 |
| 30 | Mo | 1390 | 9500 | 3820 | 8.4 |
|  | Ca | 1300 | 820 | 1.3 | 2.2 |
|  | W | 1500 | 3000 | 2730 | 0 |
|  | Ca | 590 | 4.5 | 1 | 1.6 |
| 45 | Mo | / | / | 4050 | / |
|  | Ca | / | / | 1.4 | / |
|  | W | 2400 | 3400 | 3050 | / |
|  | Ca | 700 | 4.0 | 3.1 | / |

From these data it may be seen that the partition of Mo and W from Ca is not observed with $CO_2 + H_2O$ alone, and that the omission of $H_2O_2$ results in low solibilization of all of Mo, W, and Ca. The use of $CO_2/H_2O_2/NH_4HCO_3$ partitions calcium from tungsten but is only marginally effective with Ca/Mo. The use of $CO_2/H_2O_2/NaHCO_3$ is accordingly preferred among the various systems tested.

EXAMPLE 38

A 3.4 M$(NH_4)_2SO_4$, 1.70 M$H_2SO_4$ leach solution was prepared. Thirty ml of $H_2SO_4$ (98%) were added to 430 ml of the above solution. The resulting solution was cooled down to about 30° C. Ten ml of a 30% $H_2O_2$ solution were then mixed into the leach solution. This solution was used to leach a mixture of 48 g of precipitated $CaMoO_4$ cake (containing about 25% Mo, 15% Ca) and 14.42 g of precipitated $CaWO_4$ cake (26.9% W, 10% Ca). The leaching was carried out for 30 minutes at 30° C., after which the slurry was filtered and the filtrate analyzed (by atomic absorption) to determine its Mo and W content. The filtrate was found to contain 21.8 g/l Mo and 5.93 g/l W.

EXAMPLE 39

A mixed Mo/W calcium cake is obtained by subjecting oily tool steel grindings to the process for recovery of metal values described earlier. 150 g of wet cake (105 g solids, 45 g $H_2O$) contains the following:

|  | g |
|---|---|
| $CaMoO_4$ | 84.71 |
| $CaWO_4$ | 18.11 |
| $Ca(VO_3)_2$ | 1.43 |
| $CaCrO_4$ | 0.63 |

The above cake is slurried with 154 ml of a 3.5 M $(NH_4)_2SO_4$ solution, at room temperature, and the slurry is then added to 481 ml of sulfate solution, 2.91 M $(NH_4)_2SO_4$ and 3.11 M $H_2SO_4$, maintained at about 80° C. This first leaching is carried out by vigorously stirring the slurry at 80° C. for about 30 minutes. Following, the slurry is cooled down to a temperature of about 40° C. and then subjected to a second leaching in the presence of $H_2O_2$. This second leaching is carried out (at about 40° C., stirring for about 15–20 minutes) by adding to the above slurry 27 ml of $H_2O_2$ solution (50%) and 749 ml of solution having the following composition:

|  | mole/l |
|---|---|
| $H_2SO_4$ | 1.38 |
| $(NH_4)_2SO_4$ | 2.84 |
| $H_2O_2$ | 0.427 |
| $Mo^{+6}$ | 0.0792 |
| $W^{+6}$ | 0.0076 |
| $V^{+5}$ | 0.0006 |
| $Cr^{+6}$ | 0.0002 |

After leaching, the solids and liquid are separated by filtration. The filter cake is compressed on the filter to remove as much liquid as possible and give a filter cake of about 65–70 wt.% solids. The filtrate (pregnant liquor), about 1.4 liter, has the following composition:

|  | mole/l |  | g/l |
|---|---|---|---|
| $H_2SO_4$ | 1.425 | Mo | 29.03 |
| $(NH_4)_2SO_4$ | 2.79 | W | 8.26 |
| $H_2O_2$ | 0.52 | V | 0.421 |
|  |  | Cr | 0.150 |
|  |  | Ca | 0.380 |

EXAMPLE 40

A pregnant liquor containing both molybdenum and tungsten is obtained by leaching a mixed Mo/W calcium cake which has been generated by subjecting oily tool steel grindings to the process for recovery of metal values described earlier. The composition of this liquor is as follows:

| Mo | 12.05 g/l |
|---|---|
| W | 2.30 g/l |
| $H_2SO_4$ | 3.5 M |
| $(NH_4)_2SO_4$ | 1.5 M |
| $H_2O_2$ | 1.0 M |
| $V^{+5}$ | 0.305 g/l |
| $Cr^{+6}$ | 0.075 g/l |

Sulfuric acid 98%, 163 ml, is added to 1500 ml of the above pregnant liquor and the resulting solution is boiled to decompose the peroxy-complexes and reduce its volume to 950 ml. Decomposition of the peroxy complexes results in precipitation of the tungsten values contaminated with some molybdenum values. The hot solution is found to contain about 21 g/l Mo and about 1.35 g/l W. The solids and the solution are separated by filtration. Gaseous sulfur dioxide is then bubbled through the hot solution to reduce the Cr and V values. A second filtration removes some small amount of solids. The final solution is found to contain about 23.5 g/l Mo and 0.525 g/l W.

The solid tungstic acid separated above, before reduction with $SO_2$, is repulped with 100 ml 10 M $H_2SO_4$ solution, at about 60°–70° C., and filtered. This operation is carried out four times. Then, the solids are repulped with 50 ml $H_2O$, at room temperature, and a final tungstic acid product is separated by filtration. The filtrates from each repulp/filter operation above, are analyzed, by atomic absorption spectroscopy, to determine their Mo and W content.

The results from these determinations are given below:

| Filtrate | Repulp solution M $H_2SO_4$) | Volume in ml/ml out | Mo g/l | W g/l |
|---|---|---|---|---|
| 1 | 10 | 100/93 | 1.675 | 0.105 |
| 2 | 10 | 100/98 | 1.050 | 0.225 |
| 3 | 10 | 100/98 | 0.500 | 0.190 |
| 4 | 10 | 100/95 | 0.025 | 0.090 |
| 5 | 0 | 50/46 | 0.040 | 1.600 |

The wet tungstic acid collected after the last filtration weighs 8.12 g. One gram of this material is dissolved in 20 ml of NaOH solution and the solution is analyzed by atomic absorption spectroscopy. This solution is found to contain 14.0 gW/l and 0.22 gMo/l.

EXAMPLE 41

Molybdenum and tungsten values are leached from a mixed Mo/W calcium cake with a $H_2SO_4/Nh_4HSO_4$ solution containing $H_2O_2$. After separation from the $CaSO_4$ tailings, the solution is heated to decompose the peroxy complexes and precipitate out most of the W values, as described in Example 40. The solution, after removal of solids by filtration, is found to contain:

| $Mo^{+6}$ | 37.5 g/l |
|---|---|
| $W^{+6}$ | 1.29 g/l |
| $(NH_4)_2SO_4$ | 3.0 M |
| $H_2SO_4$ | 2.75 M |

Five grams of activated charcoal is added to one liter of the above solution to remove some of the tungsten remaining in solution. The charcoal and the solution are mixed at about 80° C. for 30 minutes after which the solids and liquid are separated by filtration. The concentration of W is now 0.448 g/l and that for Mo is 36.6 g/l.

Part of the above solution, 330 ml, is partially neutralized, to pH 2.8 at 20° C., by introducing gaseous ammonia and cooling to maintain the temperature at about 20° C. A precipitate containing some of the metal values is formed. The concentrations of Mo and W at this stage are 27.37 g/l and 0.260 g/l, respectively. Following the above pH adjustment the slurry is heated at about 95° C. for 3 hours after which the solids and liquid are separated by filtration. The filtration is done at about 80°–90° C. The raffinate contains 0.95 g Mo/l and 0.170 g W/l. On cooling ammonium sulfate crystallizes out in the raffinate and it is separated by filtration; its solids content is higher than about 93%. The ammonium sulfate collected after washing with a small amount of cold water contains insignificant levels of Mo and W as contaminants.

EXAMPLE 42

A mixture of precipitated calcium molybdate, 10 g (25% Mo), and calcium tungstate, 3g (26.9% W) is leached with 100 ml of a 12.4 N $H_2SO_4$ solution by stirring and heating under refluxing conditions. After one hour of heating, the solids and solution are separated by filtration. The solution, about 67–70 ml, is analyzed by atomic absorption spectroscopy to determine its Mo and W content: 22 g Mo/l and 1.0 g W/1. The above solution is treated with 1 g of activated charcoal, as described in Example 41, after which its Mo and W content is determined: 20.5 g Mo/l and 0.1 g W/l. The wet filter cake separated after the leaching with the 12.4 N $H_2SO_4$ solution, i.e. first leaching in the absence of $H_2O_2$, is repulped (without previously washing the cake) with a leach solution containing 9 ml $H_2O$, 1 ml $H_2O_2$ (50%) and 20 ml $H_2SO_4$ (98%). The slurry is mixed for 1 hour at about 35°–40° C., (higher temperature are avoided in order to prevent the rapid decomposition of $H_2O_2$). Following a filtration of the above slurry, the pregnant liquor containing $H_2O_2$ is analyzed, by atomic absorption spectroscopy, to determine its W and Mo content: 7.15 g W/l and 3.43 g Mo/l.

EXAMPL 43

A calcium cake containing 13.32 wt.% Ca, 27.1 wt.% Mo, 7.72 wt.% W, contaminated with some vanadium and chromium values, was obtained by subjecting oily tool steel grindings to the process of this invention.

Fifty grams of this cake were leached, at 80° C. for one hour, with 180 ml solution having a 6 M total sulfate ion content (1.8 M $(NH_4)_2SO_4$ plus 4.2 $M.H_2SO_4$). An additional 16.65 g $H_2SO_4$ was introduced in the leaching step (stoichiometric amount necessary for the rejection of calcium as $CaSO_4$). After leaching, the slurry was filtered to yield approximately 190 ml solution (61 g Mo/l and 1.72 g W/l) and 61.51 g of wet filter cake containing $CaSO_4$, most of the tungsten values and some molybdenum values. The wet filter cake, without washing, was subjected to a second leaching with 64.33 ml of an acidic sulfate solution (2.7 M $(NH_4)_2SO_4$ plus 3.3 M $H_2SO_4$) to which 2 ml of hydrogen peroxide (50%) were added. This leaching was done at 45° C. for 15 minutes, while stirring. The solids were then separated and washed, the wash water collected with the filtrate, 115 ml solution containing 4.64 g W/l and 15.4 g Mo/l. Tungsten values were then precipitated from this solution by adding 9 ml of $H_2SO_4$(98%) and heating to decompose the peroxy complexes and boil off some of the water. 45 ml of solution (1.55 g W/l and 31.6 g Mo/l) were separated by filtering the above slurry. The resulting filter cake was repulped with 16.6 ml of 10 M $H_2SO_4$ solution, at 50° C. Filtration of this slurry yielded 2.17 g of a tungsten containing wet solid product and 16 ml solution (containing 2.61 g Mo/l and 0.055 g W/l). A second repulp/filter step and a wash on the filter (each with 10 ml 10 M $H_2SO_4$ solution) yielded 8 ml (0.88 g Mo/l and 0.07 g W/l) and 10.5 ml (0.096 g Mo/l and 0.04 g W/l) filtrates, respectively. Finally, the wet filter cake was dissolved in 71 ml of a NaOH solution to yield 72 ml of W and Mo bearing solution (4.2 g W/l, 0.63 g Mo/l, chromium and vanadium values were below detectable levels by atomic absorption spectroscopy).

The Mo pregnant liquor, separated after the first leach at the beginning of this experiment, 190 ml of it containing 61 g Mo/l and 1.72 g W/l, was treated with $SO_2$ to reduce $Cr^{+6}$ and $V^{+5}$ to $Cr^{+3}$ and $V^{+4}$, respectively. Following, ten grams of activated carbon were added to the solution to remove most of the remaining W. The resulting solution contained 51.6 g Mo/l and 0.281 g W/l.

Molybdenum values were precipitated as $4MoO_3.2NH_3.H_2O$ by partially neutralizing the Mo bearing solution with $NH_3$ gas to pH 2.5, and heating at 50°–60° C. for 1.5 hrs. The raffinate obtained from the above slurry contained 1.71 g Mo/l and less than 0.05 W/l. It was expected that at least part of the Cr and V impurity values in solution would co-precipitate with the ammonium tetramolybdate product. To separate these impurities from Mo values, the wet solid ammonium tetramolybdate was dissolved in an ammoniacal solution and then filtered. The solids on the filter were dissolved in 15 ml acidic solution with some $H_2O_2$ present and the resulting solution was found to contain 0.44 g V/l, 0.32 g Cr/l, 6.54 g Mo/l and 0.22 g W/l. The ammoniacal filtrate separated above after dissolution of the contaminated Mo precipitate contained 47 g Mo/l and 0.479 g/l W. This solution was then heated to remove some of its $NH_3$ content, as well as to evaporate some water. On cooling, a molybdenum paramolybdate product crystallized out. The remaining solution, 25 ml, contained 30 g Mo/l and 0.340 g W/l. Part of the molybdenum product, 1.81 g, was then dissolved in 10 ml NaOH solution and analyzed for Mo and W. This solution was found to contain 82.2 g Mo/l and 1.1 g W/l.

The invention may be embodied in other specific forms without departing from the spirit and scope thereof. Accordingly, other embodiments are within the following claims.

What is claimed is:

1. A process for recovering chromium, vanadium, molybdenum, and tungsten values from a feed material containing said values and one or more values selected from the group consisting of cobalt, nickel, iron and copper, said process comprising the steps of:
   A. calcining said feed material in an oxygen containing atmosphere and in the presence of sodium carbonate;
   B. water leaching the product of the calcination of step A to produce an aqueous alkaline leach liquor containing chromium, tungsten, vanadium, and molybdenum values;
   C. selectively removing molybdenum, tungsten, and vanadium from the leach liquor produced in step B by treatment with calcium ions to produce a mixed calcium cake containing tungstate, vanadate, and molybdate ions and a chromium containing leach liquor;
   D. reducing and recovering chromium values in the leach liquor of step C, a carbon containing reducing agent being used to reduce the leach liquor;
   E. treating the calcium cake containing tungstate, vanadate, and molybdate ions produced in step C with an aqueous acidic solution to selectively remove calcium and vanadium values as a vanadium containing liquor;
   F. recovering vanadium from the liquor of step E;
   G. selectively dissolving molybdenum and tungsten from the calcium cake remaining after step E while precipitating calcium as a substantially tungsten and molybdenum-free solid, $H_2O_2$ being used to partition calcium; and
   H. recovering molybdenum and tungsten from the solution resulting from step G.

2. The process of claim 1 wherein the feed material is selected from the groups consisting of oxidation resistant superalloy scrap, tool steel scrap, hardfacing scrap, spent catalysts, chromite ores, wolframite ores, carbided metal values, stainless steel scrap, and mixtures thereof.

3. The process of claim 1 wherein the reducing agent employed in step D is selected from the group consisting of carbon monoxide, formate ions, formaldehyde, methanol, and mixtures thereof, sodium carbonate is produced as a byproduct of said reduction, and said sodium carbonate is recycled to step A.

4. The process of claim 1 wherein step C further includes the addition of formic acid to the leach liquor and the formic acid content of the chromium containing leach liquor is used as a reducing agent in step D.

5. The process of claim 1 wherein residual ions selected from the groups consisting of $CrO_4=$, $Cr_2O_7=$, $WO_4=$, $VO_3-$, $MoO_4=$, and mixtures thereof remain in the leach liquor after the reduction of step D and said residual ions are recycled to a step prior to step C.

6. The process of claim 1 wherein formate ions and a carbonic acid solution having a superatmospheric $CO_2$ pressure are employed in step E to selectively remove calcium and vanadium values from said calcium cake, and after step F, the formate ions are recycled to a step prior to step E.

7. The process of claim 1 wherein residual vanadium values remain in the spent vanadium containing liquor after step F, and said residual vanadium values are recycled to a step prior to step E.

8. The process of claim 1 wherein step G is effected by the addition of hydrogen peroxide and sulfuric acid and said solid comprises $CaSO_4$.

9. The process of claim 1 wherein water leaching step B results in a leach residue comprising iron oxides and a portion of said residue is employed as a diluent in step A.

10. The process of claim 1 wherein the water leaching step (B) results in a leach residue comprising metal values selected from the group consisting of nickel, cobalt, copper and mixtures thereof, said process comprising the additional step of recovering metal values from said leach residue.

11. A process for recovering chromium, molybdenum, and tungsten values from a feed material containing said values and one or more values selected from the group consisting of cobalt, nickel, iron, and copper, said process comprising the steps of:
   A. calcining said feed material in an oxygen containing atmosphere and in the presence of sodium carbonate;
   B. water leaching the product of the calcination of step A to produce an aqueous alkaline leach liquor containing chromium, tungsten, and molybdenum values;
   C. selectively removing molybdenum and tungsten from the leach liquor produced in step B by treatment with calcium ions to produce a mixed calcium cake containing tungstate and molybdate ions and a chromium containing leach liquor;
   D. reducing and recovering chromium values in the leach liquor of step C, a carbon containing reducing agent being used to reduce the leach liquor;
   E. selectively dissolving molybdenum and tungsten from the calcium cake remaining after step C while precipitating calcium as a substantially tungsten and molybdenum-free solid, $H_2O_2$ being used to partition calcium; and
   F. recovering molybdenum and tungsten from the solution resulting from step E.

12. The process of claim 11 wherein the feed material is selected from the groups consisting of oxidation resistant superalloy scrap, hardfacing scrap, spent catalysts, chromite ores, wolframite ores, carbided metal values, stainless steel scrap, and mixtures thereof.

13. The process of claim 11 wherein the reducing agent employed in step D is selected from the group consisting of carbon monoxide, formate ions, formaldehyde, methanol, and mixtures thereof, sodium carbonate is produced as a byproduct of said reduction, and said sodium carbonate is recycled to step A.

14. The process of claim 11 wherein step C further includes the addition of formic acid to the leach liquor and the formic acid content of the chromium containing leach liquor is used as a reducing agent in step D.

15. The process of claim 11 wherein residual ions selected from the group consisting of $CrO_4^=$, $Cr_2O_7^=$, $WO_4^=$, $MoO_4^=$, and mixtures thereof remain in the leach liquor after the reduction of step D and said residual ions are recycled to a step prior to step C.

16. The process of claim 11 wherein step E is effected by the addition of hydrogen peroxide and sulfuric acid and said solid comprises $CaSO_4$.

17. The process of claim 11 wherein water leaching step B results in a leach residue comprising iron oxides, and a portion of said residue is employed as a diluent in step A.

18. The process of claim 11 wherein water leaching step B results in a leach residue comprising metal values selected from the group consisting of nickel, cobalt, copper and mixtures thereof, said process comprising the additional step of recovering metal values from said leach residue.

19. The process of claim 11 wherein the mixed calcium cake produced in step C contains carbonate ions and chromium values, and prior to step E, said cake is treated with an aqueous formic acid solution to liberate $CO_2$ and to partition chromium values therefrom.

20. The process of claim 19 wherein a chromium-pregnant liquor results from said digestion and said liquor is recycled.

* * * * *